(12) United States Patent
Wilmer et al.

(10) Patent No.: US 7,344,298 B2
(45) Date of Patent: Mar. 18, 2008

(54) METHOD AND APPARATUS FOR BLENDING PROCESS MATERIALS

(75) Inventors: Jeffrey A. Wilmer, Mesa, AZ (US); Brian Alan McAllister, Chandler, AZ (US); Daniel A. Swan, Phoenix, AZ (US); David E. Sitterud, Gilbert, AZ (US)

(73) Assignee: Celerity, Inc., Austin, TX (US)

( * ) Notice: Subject to any disclaimer, the term of this patent is extended or adjusted under 35 U.S.C. 154(b) by 203 days.

(21) Appl. No.: 10/623,137

(22) Filed: Jul. 18, 2003

(65) Prior Publication Data

US 2004/0100860 A1    May 27, 2004

Related U.S. Application Data

(60) Provisional application No. 60/397,441, filed on Jul. 19, 2002.

(51) Int. Cl.
*B01F 15/02* (2006.01)
*B01F 15/04* (2006.01)

(52) U.S. Cl. .............. 366/136; 366/152.1; 366/189
(58) Field of Classification Search ........... 366/136, 366/137, 152.4, 153.1, 189, 182.1, 152.1
See application file for complete search history.

(56) References Cited

U.S. PATENT DOCUMENTS

| | | | |
|---|---|---|---|
| 3,161,203 A * | 12/1964 | Hathorn et al. ............ 366/137 |
| 4,059,929 A | 11/1977 | Bishop | |
| 4,242,841 A | 1/1981 | Ushakov et al. | |
| 4,327,759 A | 5/1982 | Millis | |
| 4,362,033 A * | 12/1982 | Young ........................ 68/207 |
| 4,439,042 A | 3/1984 | Bertoglio | |
| 4,474,476 A * | 10/1984 | Thomsen .................. 366/152.4 |
| 4,642,222 A | 2/1987 | Brazelton | |
| 4,654,802 A | 3/1987 | Davis | |
| 4,784,495 A * | 11/1988 | Jonsson et al. ........... 366/151.1 |
| 4,964,732 A | 10/1990 | Cadeo et al. | |
| 5,114,239 A * | 5/1992 | Allen ........................... 366/6 |
| 5,255,821 A | 10/1993 | Hall et al. | |
| 5,271,521 A | 12/1993 | Noss et al. | |
| 5,332,125 A | 7/1994 | Schmitkons et al. | |
| 5,372,421 A | 12/1994 | Pardikes | |
| 5,407,526 A | 4/1995 | Danielson et al. | |
| 5,409,310 A * | 4/1995 | Owczarz .................. 366/153.1 |
| 5,423,607 A | 6/1995 | Jones et al. | |
| 5,476,320 A * | 12/1995 | Taguchi et al. .......... 366/152.1 |
| 5,478,435 A | 12/1995 | Murphy et al. | |
| 5,516,423 A * | 5/1996 | Conoby et al. ............. 366/136 |
| 5,584,959 A | 12/1996 | Kimura et al. | |
| 5,634,715 A | 6/1997 | Stehr et al. | |
| 5,641,410 A | 6/1997 | Peltzer | |

(Continued)

FOREIGN PATENT DOCUMENTS

DE        1962864        3/1971

(Continued)

*Primary Examiner*—Tony G Soohoo
(74) *Attorney, Agent, or Firm*—Lowrie, Lando & Anastasi, LLP

(57) ABSTRACT

A method and apparatus for blending and supplying process materials. The method and apparatus are particularly applicable to the blending of ultra-high purity chemicals, the blending of abrasive slurries with other chemicals for the polishing of semiconductor wafers, and high-accuracy blending of chemicals.

23 Claims, 18 Drawing Sheets

U.S. PATENT DOCUMENTS

| | | | |
|---|---|---|---|
| 5,647,391 A * | 7/1997 | Chan et al. ............... 366/152.4 |
| 5,750,440 A | 5/1998 | Vanell et al. |
| 5,800,056 A * | 9/1998 | Suzuki et al. ............ 366/152.4 |
| 5,823,219 A | 10/1998 | Purvis et al. |
| 5,924,794 A * | 7/1999 | O'Dougherty et al. ...... 366/136 |
| 5,935,332 A * | 8/1999 | Caucal .................... 366/152.1 |
| 5,993,671 A | 11/1999 | Peltzer |
| 6,048,256 A | 4/2000 | Obeng et al. |
| 6,050,283 A | 4/2000 | Hoffman et al. |
| 6,105,606 A | 8/2000 | Jackson |
| 6,109,778 A | 8/2000 | Wilmer |
| 6,149,294 A * | 11/2000 | Jonsson et al. ............. 366/136 |
| 6,199,599 B1 | 3/2001 | Gregg et al. |
| 6,217,659 B1 | 4/2001 | Botelho et al. |
| 6,224,778 B1 | 5/2001 | Peltzer |
| 6,260,588 B1 | 7/2001 | Noah et al. |
| 6,267,641 B1 | 7/2001 | Vanell et al. |
| 6,276,404 B1 | 8/2001 | Birtcher et al. |
| 6,536,468 B1 | 3/2003 | Wilmer et al. |
| 6,799,883 B1 * | 10/2004 | Urquhart et al. ......... 366/152.4 |
| 6,899,452 B2 * | 5/2005 | Hamamoto et al. ...... 366/152.2 |
| 6,923,568 B2 * | 8/2005 | Wilmer et al. ........... 366/152.1 |
| 2002/0048213 A1 * | 4/2002 | Wilmer et al. .............. 366/136 |
| 2003/0095472 A1 * | 5/2003 | Fukui ..................... 366/152.1 |
| 2003/0103852 A1 | 6/2003 | Schob |
| 2005/0226746 A1 | 10/2005 | Schob |

FOREIGN PATENT DOCUMENTS

| | | |
|---|---|---|
| DE | 2320212 | 11/1974 |
| JP | 02285635 | 11/1990 |
| JP | 07077597 | 3/1995 |
| TW | 424003 | 3/2001 |
| WO | WO 0014512 | 3/2000 |

* cited by examiner

METHOD AND APPARATUS FOR BLENDING PROCESS MATERIALS

This application claims priority to U.S. Provisional Patent application No. 60/397,441 filed Jul. 19, 2002, entitled "Method and Apparatus for Blending Process Materials," which is herein incorporated by reference in its entirety.

BACKGROUND OF THE INVENTION

Blended process chemicals are required, for example, in the semiconductor industry. In typical blend style systems, there are two styles of mixing, which dominate the supply system marketplace: volumetric and mass. Both are quantitative techniques, which assume that the incoming liquids are uniform streams, within a narrow range of variance to chemical concentrations based on an assay of percentage of mass of specific chemical content by total unit mass. In most cases, these small fluctuations are of a few percentage; for example, semiconductor grade hydrogen peroxide, which is typically assumed to be at thirty percent by weight, may vary from 28 to 33 percent by weight. When targeting blends requiring final contributions by these chemicals to be from a few tenths of a percent to around, say, four percent by weight, the wide range of incoming percent weight of incoming chemical may lead to variations requiring redress to the final solution. Redress of a final solution may result form off-line or in-line techniques, which range from physical sample collection and assay via lab analysis to sample diversion and analysis by automated sample assay systems. A significant amount of time may result in the final acceptance of a liquid chemical blend, awaiting transfer, for use in a production environment.

The current style of blending liquids in a chemical application involves the use of volumetric or mass measurements to dispense each of the required constituents. Volumetric measurements are made through the use of a flow meter or level sensing. Flow meters measure the volume of liquid through some mechanism, such as paddle wheel, turbine wheel, ultrasonic frequency, differential pressure measurement, etc. Level sensors gauge the height of a column of liquid within the vessel and correlate the volume through a known cross sectional area of the vessel.

Volumetric measurements utilize flow meters, of various styles, and level measurement components to gauge a volume dispensed into a vessel. The volumes are delivered over a period of time, which may fluctuate accordingly based on the required input parameters of the individual liquid streams to dispense the correct amount of liquid. Input parameters are based on the support systems, which are typically pressure-supplied and could by subject to changes in flow rates supplied to the blending systems. Fluctuations may be caused by pulsations in the style of delivery mechanism used in supply equipment, from frictional losses incurred through support lines, or various head loss depending on the location of the supply equipment within a chemical processing facility. Any of these various contributions to slowing the supply flow of raw, individual supply streams creates an increase in time to dispense the chemical within a blend vessel.

Each of these styles of measurement incurs some form of error from the measurement. This error could be in the form of a set percentage, based on the level of sensitivity built into the device. The percentage may be a known, constant value, which is applied to the entire operational range of the flow meter. This is sometimes referred to as a full scale. Another form of error may be a percentage of the reading, which increases with increasing flow. As an example: a flow meter with a full scale error of 0.1 liters per, minute and a range of 1-10 liters per minute would generate the same error of 0.1 liters regardless of flow rate. This flow meter would be advantageous at higher flow rate values, because the fixed error is a smaller contribution to the level of inaccuracy. Since the error is a constant, the total error to the flow rate measured decreases as the flow rate increases is from 10% at 1 liter per minute, down to 1% at 10 liters per minute. As another example: a flow meter with a full scale error of 1% and a range of 1-10 liters per minute. As the flow rate increases on this flow meter, the level of inaccuracy remains a constant percentage of the flow rate. Regardless of the amount dispensed, the error remains a fixed percentage of the flow rate. As the fluid is dispensed through the flow meter to a vessel, the amount of inaccurate constituent is a product of the error rate, whether a fixed error rate or a fixed percentage of the flow rate, and the amount of time the fluid is dispensed through the flow meter. This contribution becomes a constant within a process, which is typically tuned in as the system operates.

In each case, the end result of the liquid chemical blend process is a volume of fluid maintaining a specified recipe. This recipe is detailed as a selection of ratios of a selection of certain chemical species, reagents, starting compounds, premixed ratios, and other liquid or powdered types. The requirements of the recipe is such that a certain level of tolerance must be maintained or the contents of the batch, with respect to the specific process, must be registered as unacceptable for use. An example of one such case is in the dilution of certain acids, more specifically hydrofluoric acid, used to etch layers of a wafer substrate. The etching to the layers is the result of a wafer immersed in a bath environment of hydrofluoric acid, which may be manipulated within the bath environment, such that a uniform removal of material is achieved. This process requires a specified concentration such that, over time, the material removal rate of wafers exposed is consistent: too low a concentration will not remove enough material, exposing the specific layer to be treated in successive process steps; too high a concentration may expose underlying surfaces resulting in a damaged wafer, only to be scrapped from the production lot. Another example relates to chemical and mechanical polishing, or planarization, of a wafer substrate involving metal contacts, such as tungsten or copper interconnections. An abrasive suspension involving an inert material, such as silicon dioxide or alumina oxide, is dispersed in a medium of de-ionized water containing additional modifying chemicals to maintain certain pH values for the removal process. These slurries may be mixed with oxidizing agents, such as hydrogen peroxide, ferric nitrate, potassium iodate, where the oxidizer specifically interacts with the metallic constituent of the substrate, through chemical bonding, oxidizing the metal ions. The inert abrasive acts as a mechanical agent, in conjunction with the polishing surface, to remove the oxidized metals, exposing fresh layers of material to be treated in the process. Again, the process is such that a specific concentration of oxidizer must be maintained to insure uniform removal rates, wafer to wafer, throughout the production process. If the oxidizer content varies, in the case of a below target oxidizer concentration, incomplete removal may ensue, leaving a partially planarized wafer; if the oxidizer concentration is above the specified target value, over-polished surfaces may expose and even, in some cases, damage the wafer, leading to a scrapped wafer.

Maintaining a constant supply of blended chemical to a process, where it is consumed in the production of semiconductor wafer substrates, is of importance when a fabrication facility is in full-scale production. The flow of wafers through a production facility is reduced where a bottleneck occurs, as in the case of any production facility. Bottlenecks within liquid chemical blend and dispense systems may arise from flow rate regulation, as a result of attempting to capture an accurate blend through regulating incoming liquid streams to a blending system. Factors that contribute to the duration of blending include addition of each stream to the system, circulation of product as modifying chemicals are added to the process, agitation of these constituents to achieve a desired uniform blend, measurement of the final blend, qualification procedures towards acceptance of the blend, subsequent additions to out-of-specification batches, circulation time prior to measurement, and requalification of the blend. In the event that a batch overshoots, some blending system architectures may not possess techniques to adjust a blend, leading to the contents being dumped to a drain line, only to restart the entire batch process. This loss of a batch leads to lost time and wasted chemical.

The addition of process materials to the mixing vessel is typically monitored and regulated by measuring mass or volume differences. Typical mass difference-regulated additions may involve the use of a scale on a holding vessel or tank. In this type of system, each process material is added individually, as an automated control system is not able to discern the relative amounts of two process materials added simultaneously. Typical volume difference regulated additions may involve the use of a flow meter. In either case, if the incoming liquids vary outside of the specified range, there is no immediate knowledge of an unacceptable blend until final measurements are made during acceptance qualification.

Many conventional processes require precise addition of process materials to produce a batch of blended process materials that is acceptable for its intended application. Accordingly, the measuring instruments that monitor the inputs to the mixing vessel are typically very precise to ensure batch-to-batch consistency. In most applications, even minor process variations may lead to significant differences in the batch of blended process materials, potentially rendering it useless for its intended application.

The full scale production of wafers incorporate manufacturing techniques, where semiconductor substrates and device wafers are exposed to steps; which include removal of unnecessary layers as a result of deposition steps, required planarization steps, and etching functions. These functions may require time-based processes where wafer substrates are exposed to solutions while immersed in a bath or sink, sprayed with chemical solutions during cleaning processes, undergo chemical and mechanical polishing sequences to remove material and prepare a surface for sequential process steps. Due to the high cost of producing these wafer substrates, the chemical solutions used require exacting accuracy for each blended batch of chemicals produced, in order to provide consistency in the manufacturing process. Batch to batch consistency must be maintained; insuring the overall process of wafer manufacturing minimizes scrapped wafers.

Multiple chemical recipes are becoming a prominent feature in system requirements for slurry, post CMP (Chemical Mechanical Planarization) clean, plating baths, developers, etc. The recipes required call for blending precision at or below (i.e., better than) 1%. These recipes may possess ratios from 1:1 down to 1:1000 in scale. Accurately specifying the system components necessary creates a task for any system design engineer.

SUMMARY

In one embodiment, the present invention is directed to a blending system including a blend chamber having a first inlet and a second inlet for receiving a first and a second material. The first inlet is connected to a first valve, and the second inlet is connected to a second valve. The system includes a recirculation line connected to the blend chamber to receive a mixture of the first and the second material and provide the mixture back to the blend chamber. A sensor is disposed in the recirculation line, and a controller is connected to the sensor and to the second valve to control the amount of the second material received at the second inlet to achieve a desired concentration of the second material in the mixture.

In another embodiment, the present invention is directed to a system for blending at least two components having a blend chamber. The blend chamber has a first inlet and a second inlet for receiving a first and second material, respectively, and outlet for delivering a mixture of the first component and the second component to a tool, and an inlet and an outlet for a recirculation line. The system also includes means for analyzing the mixture in the recirculation line and adjusting the rate at which the second component is added to the blend chamber.

In another embodiment, the invention is directed to a method for blending at least two materials to a desired concentration. A first material is provided in bulk to a blend chamber and a flow of a second material is provided to the blend chamber to create a mixture. A characteristic of the mixture is measured while the mixture is recirculating and the flow of the second material to the blend chamber is adjusted to attain the desired concentration.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

Figure 1:
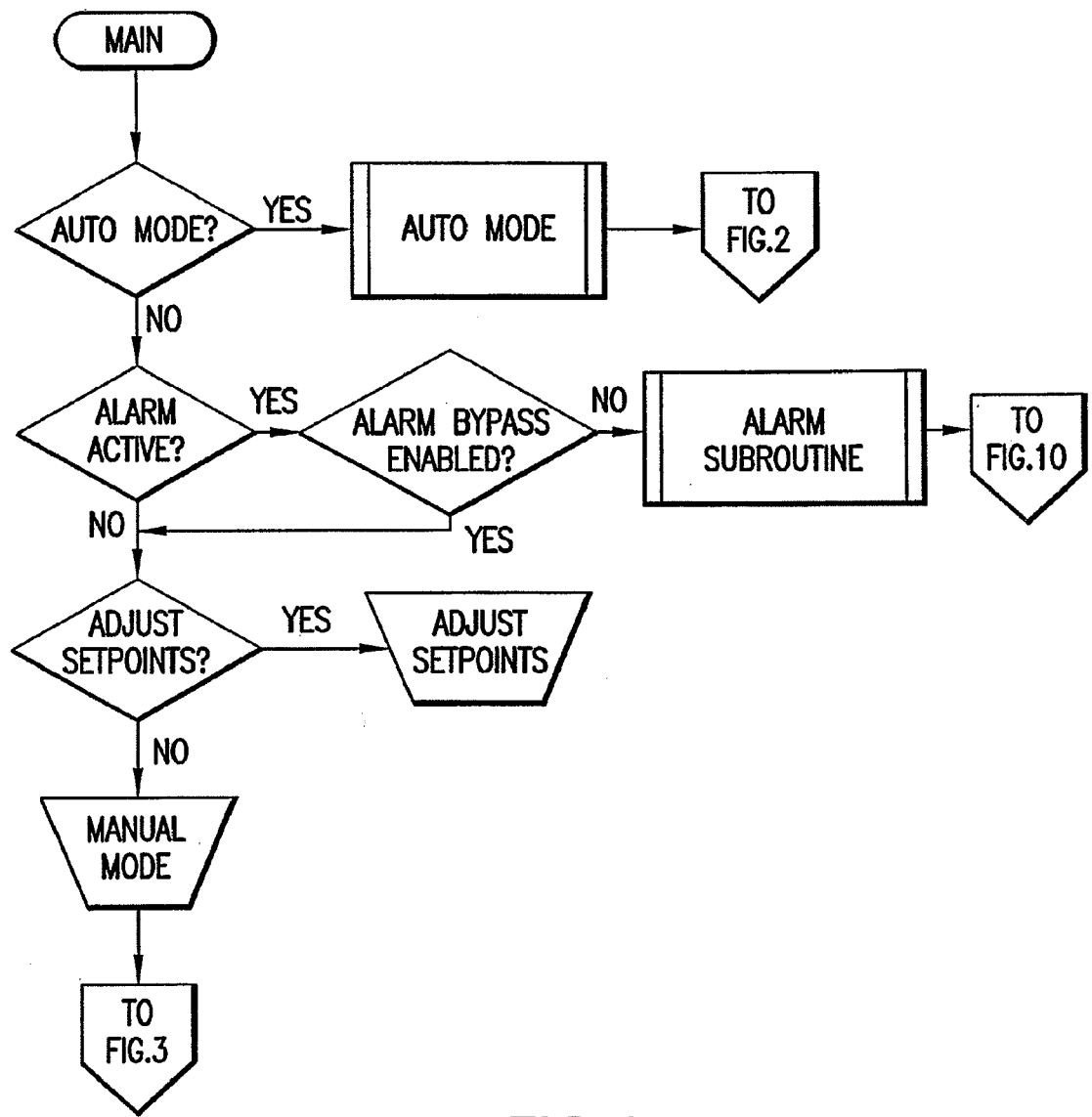
FIGS. 1-13 are process flow diagrams of one embodiment of the blending process of the present invention.
Figure 2:
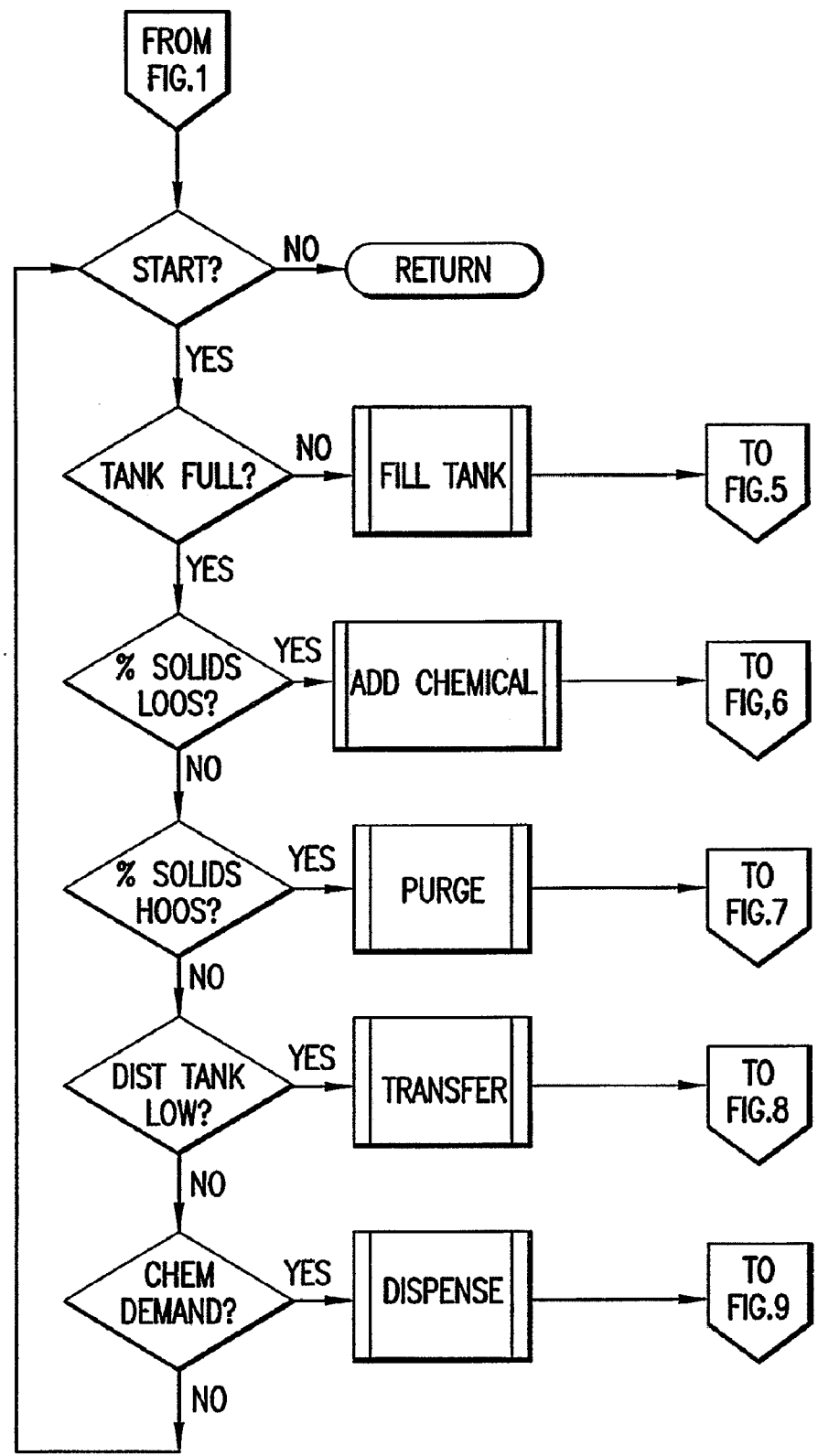
Figure 3:
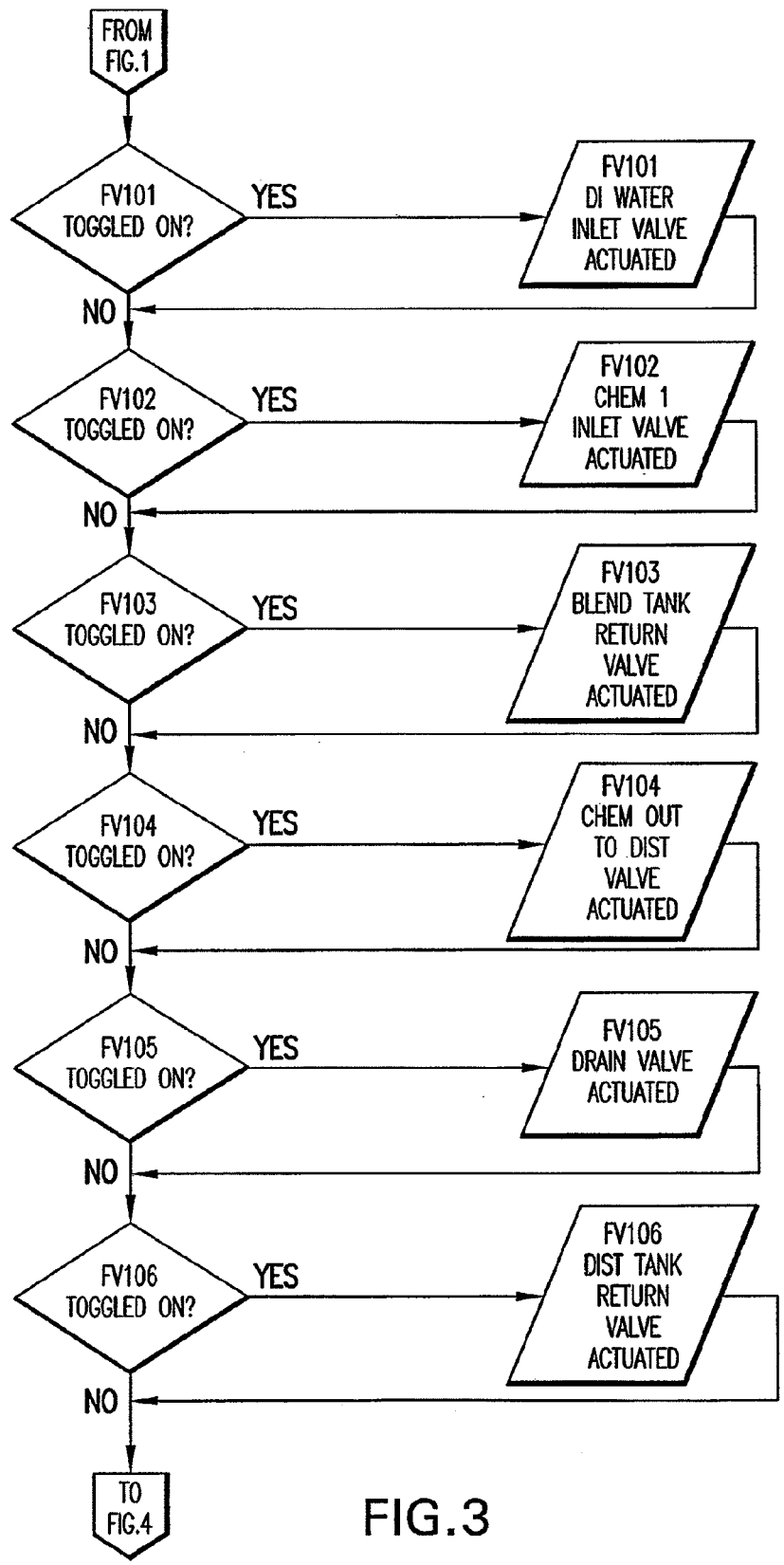
Figure 4:
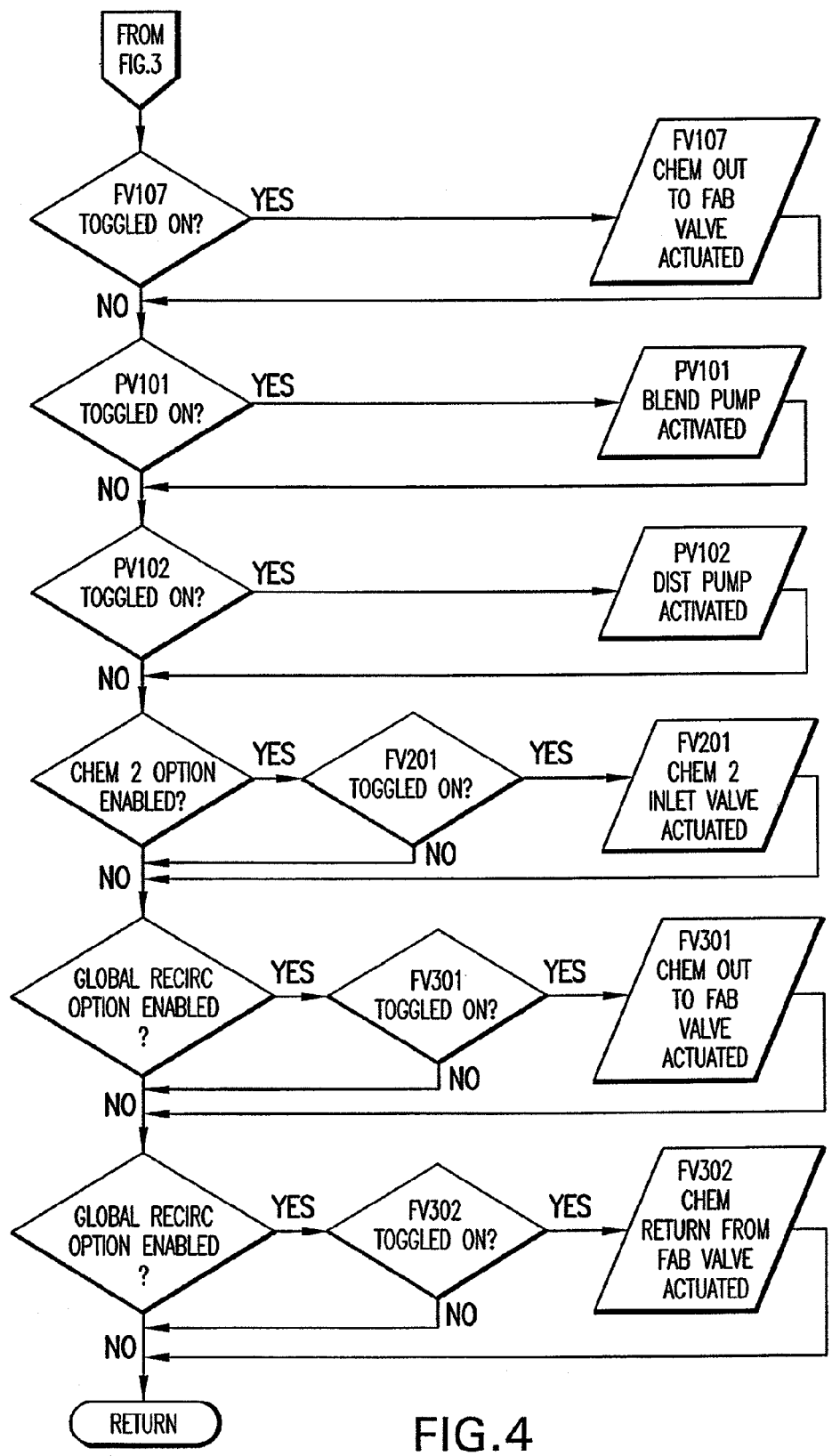
Figure 5:
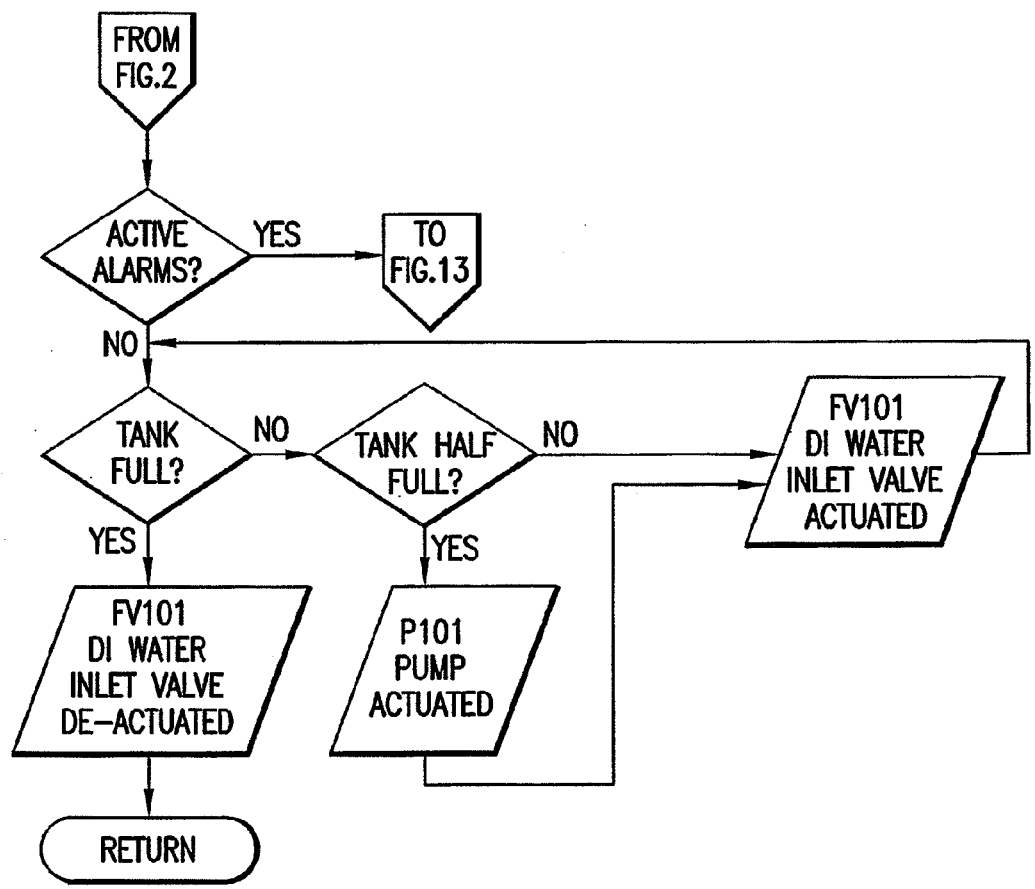
Figure 6:
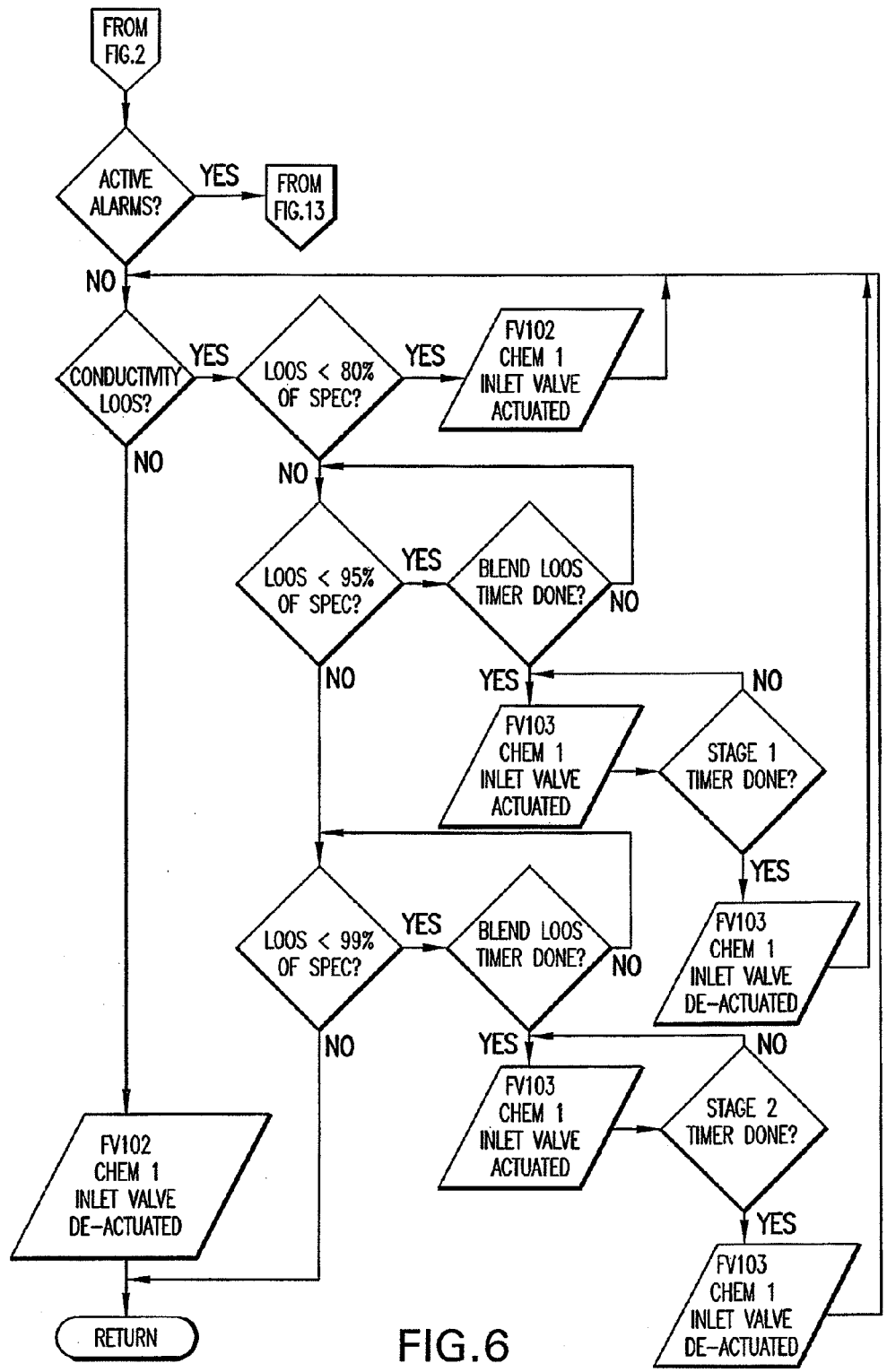
Figure 7:
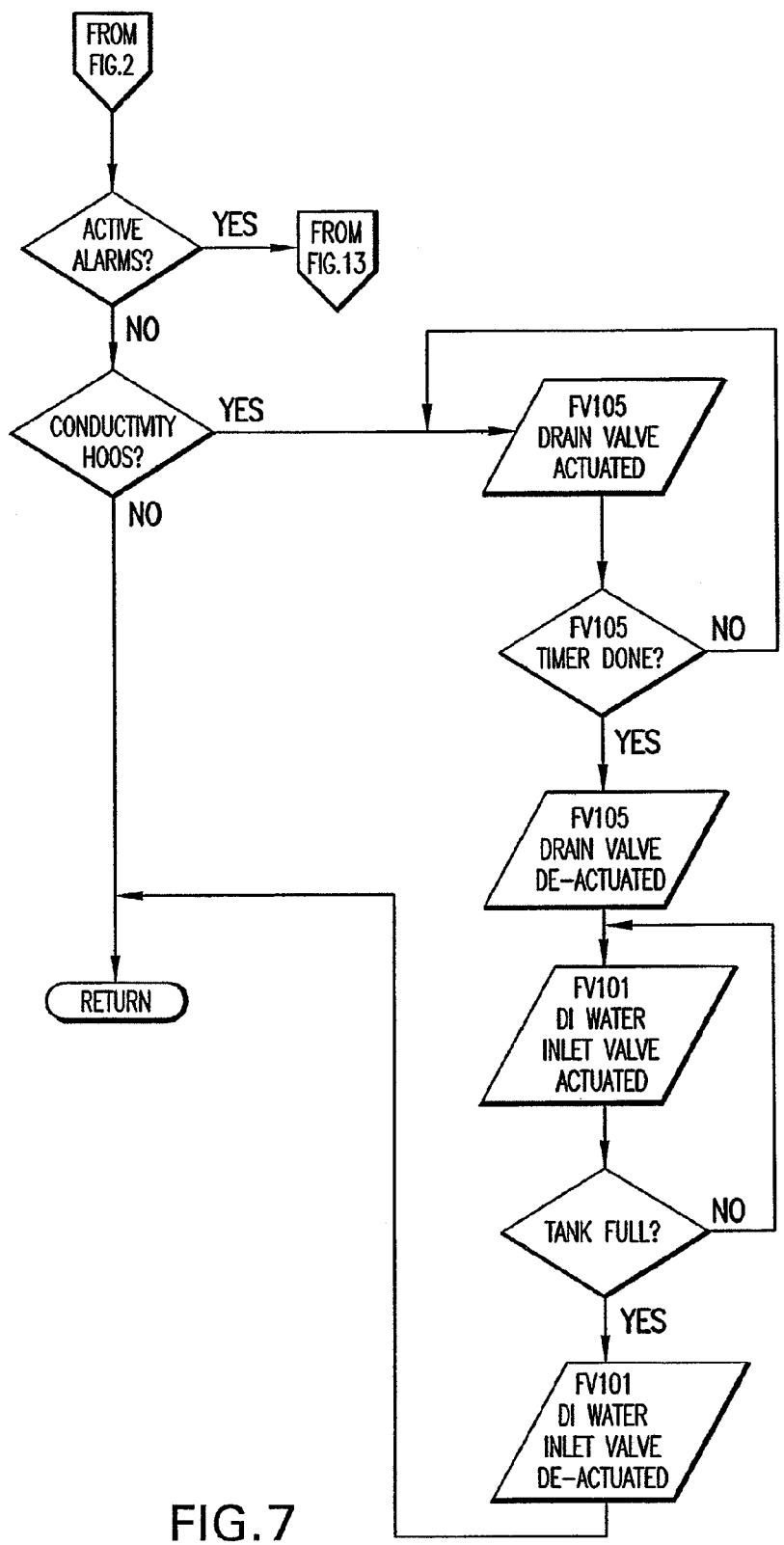
Figure 8:
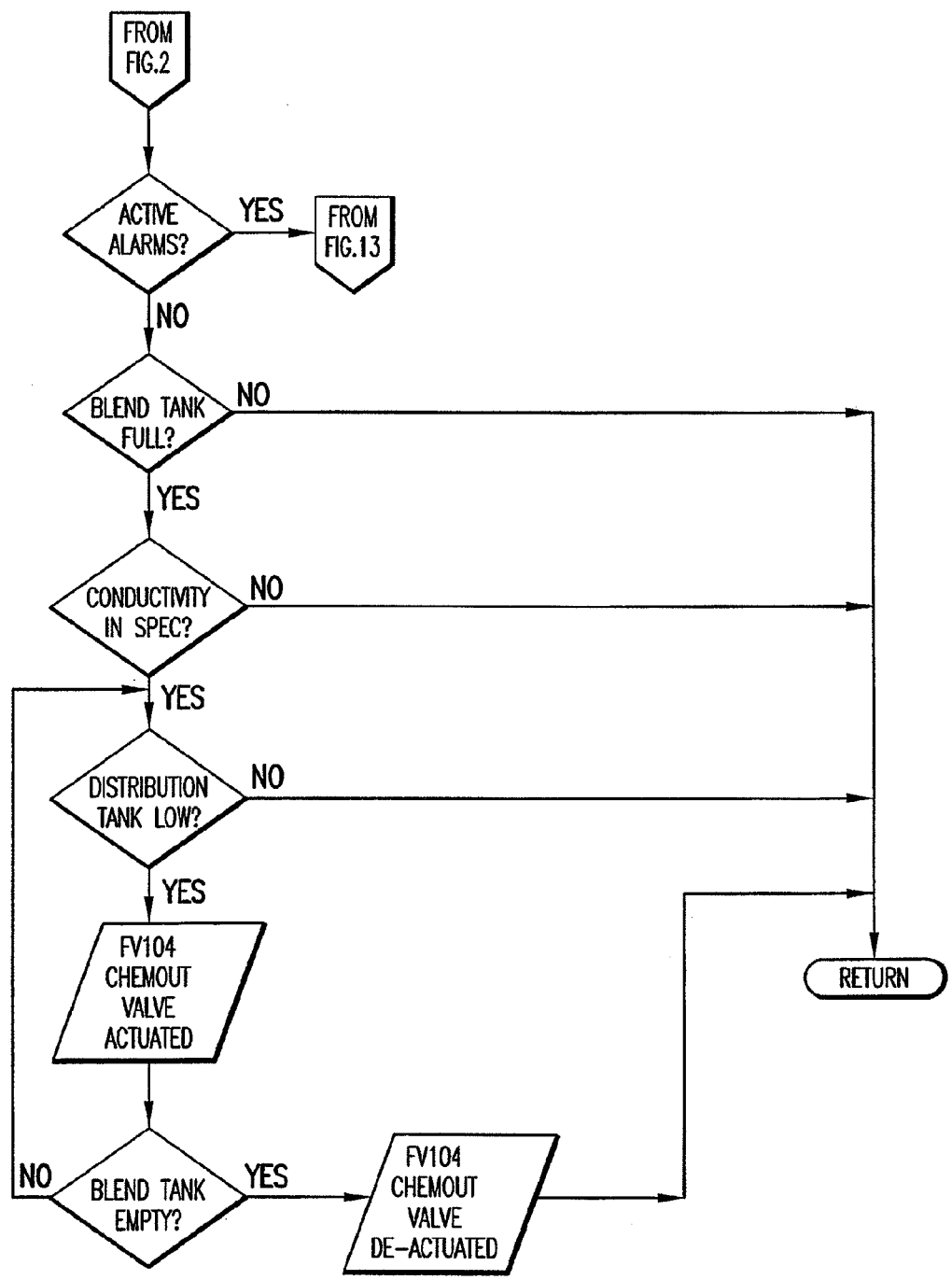
Figure 9:
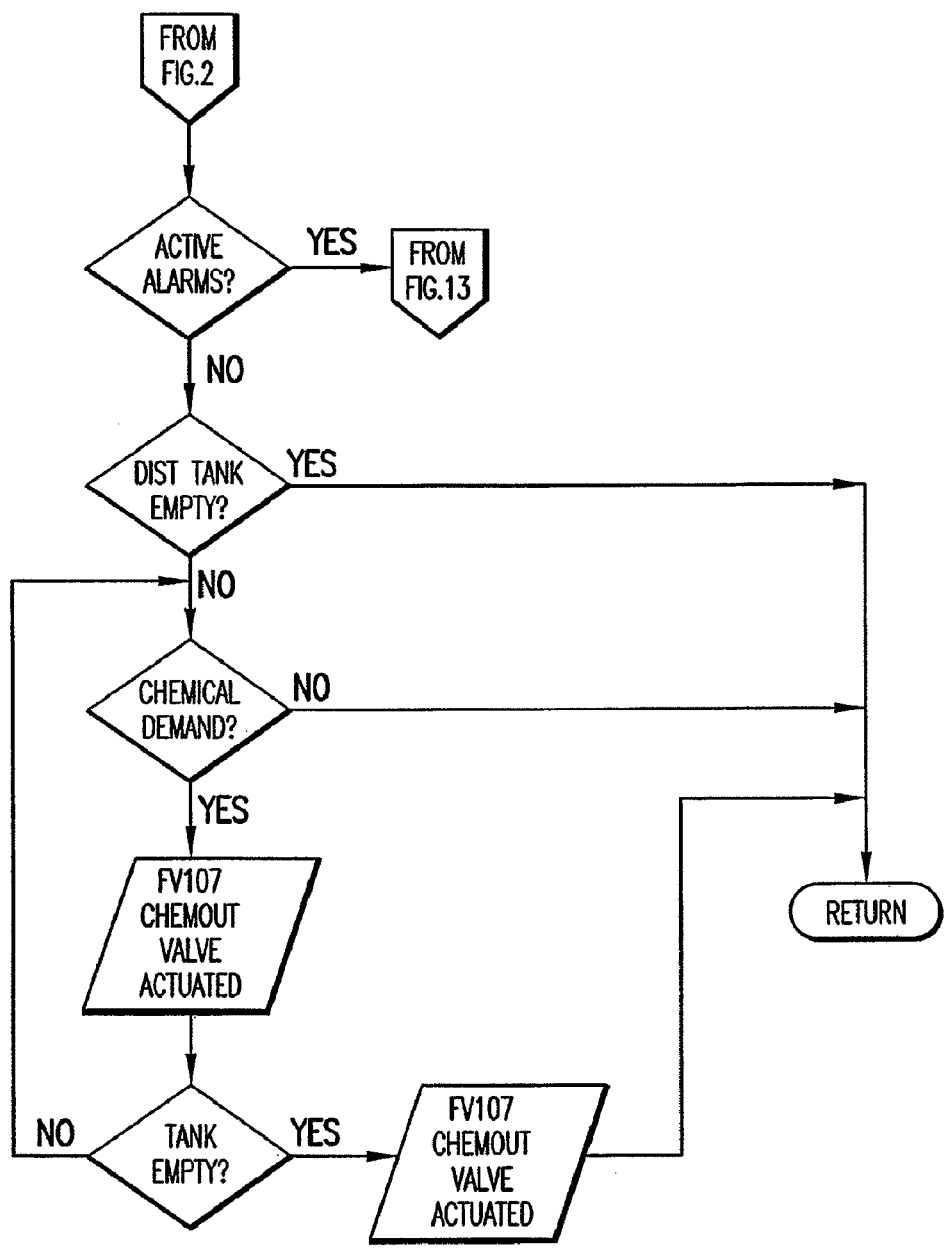
Figure 10:
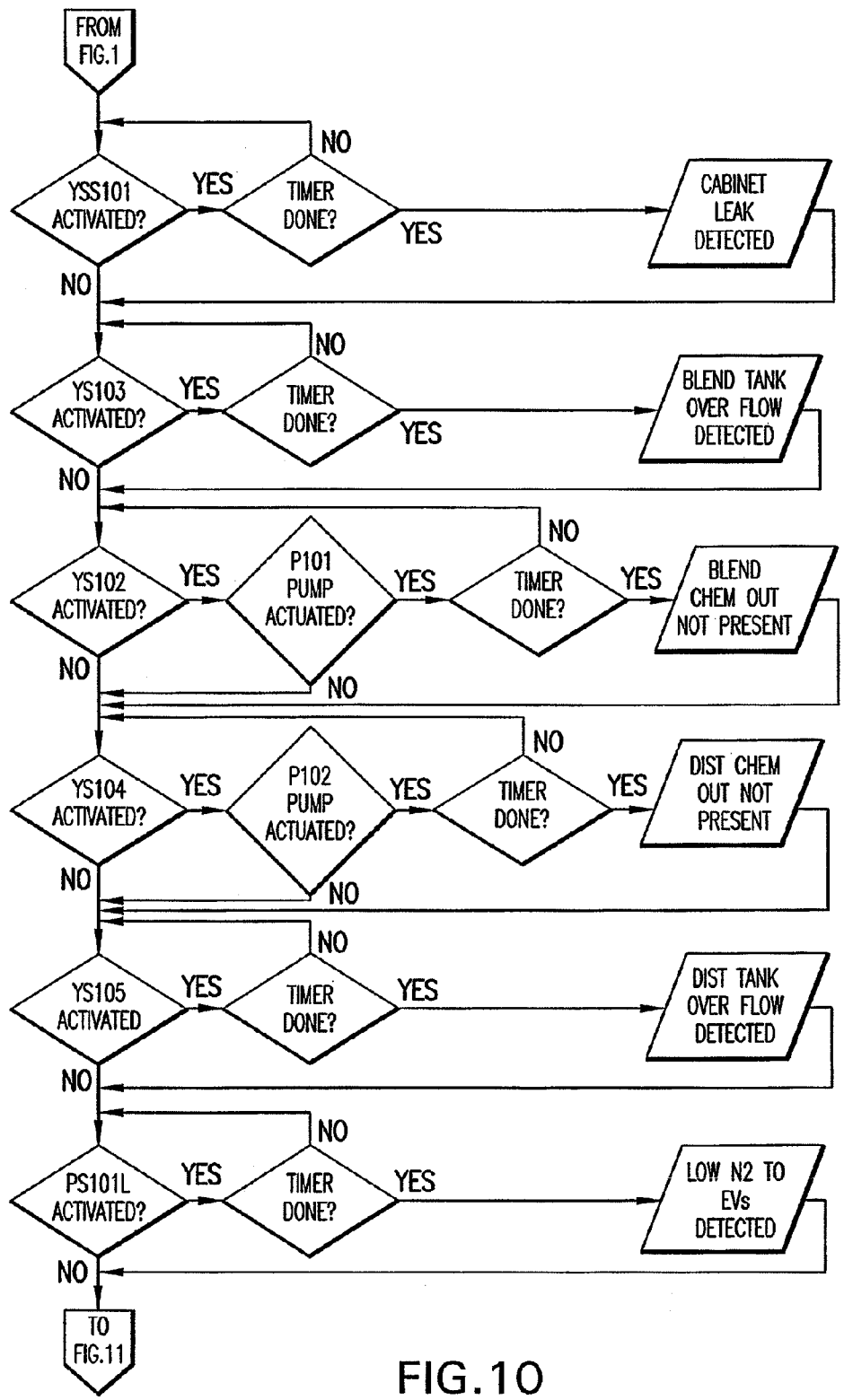
Figure 11:
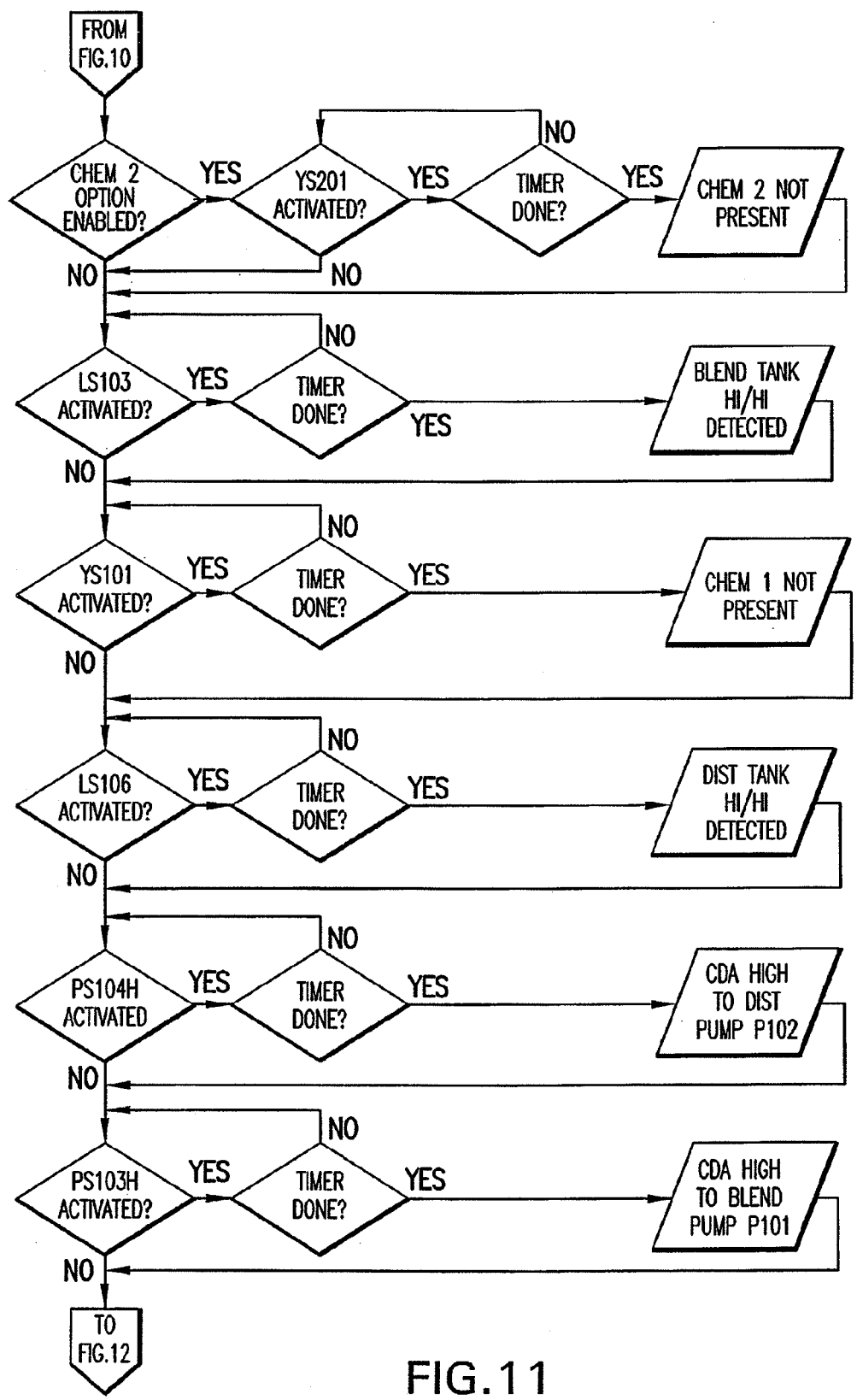
Figure 12:
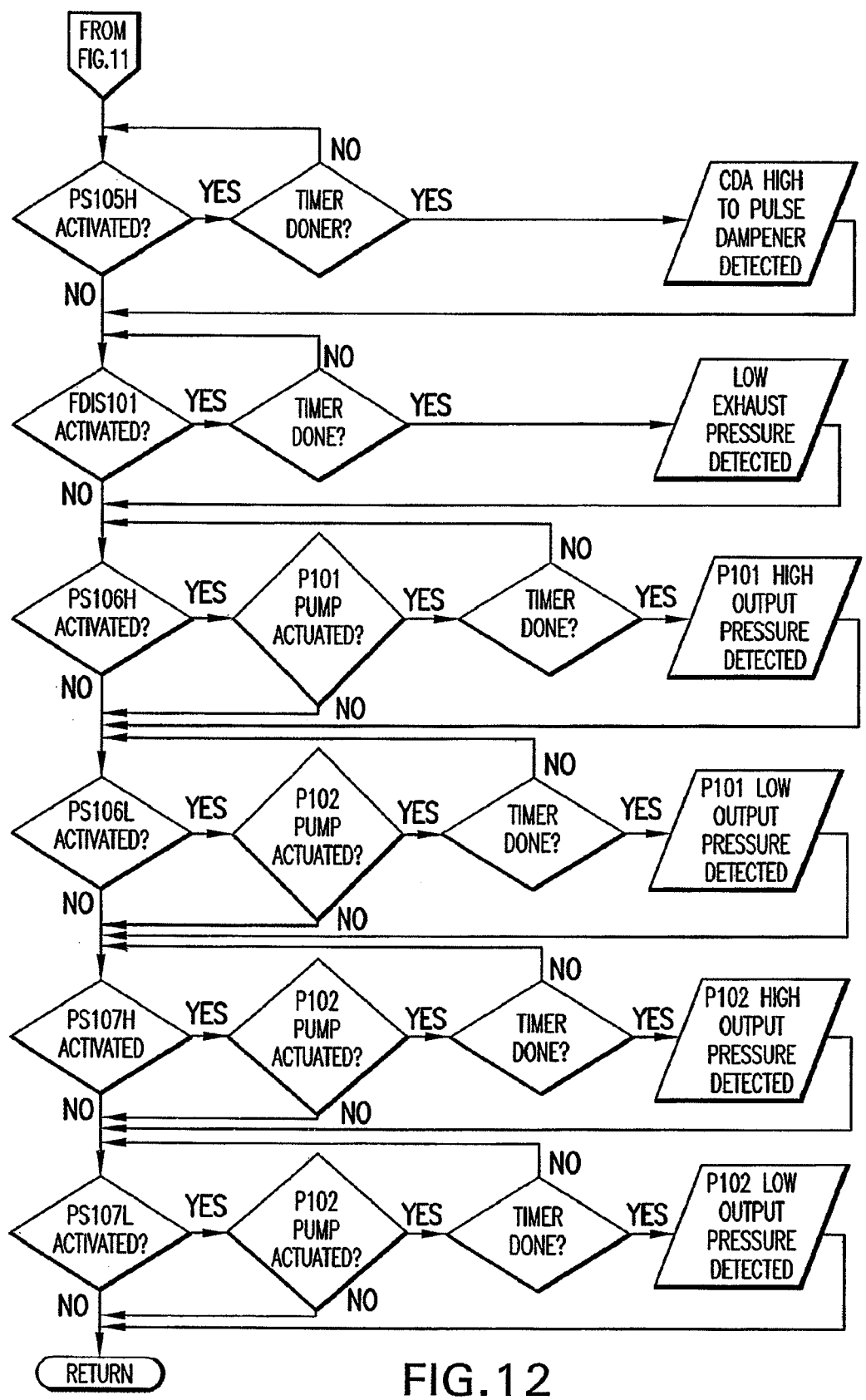
Figure 13:
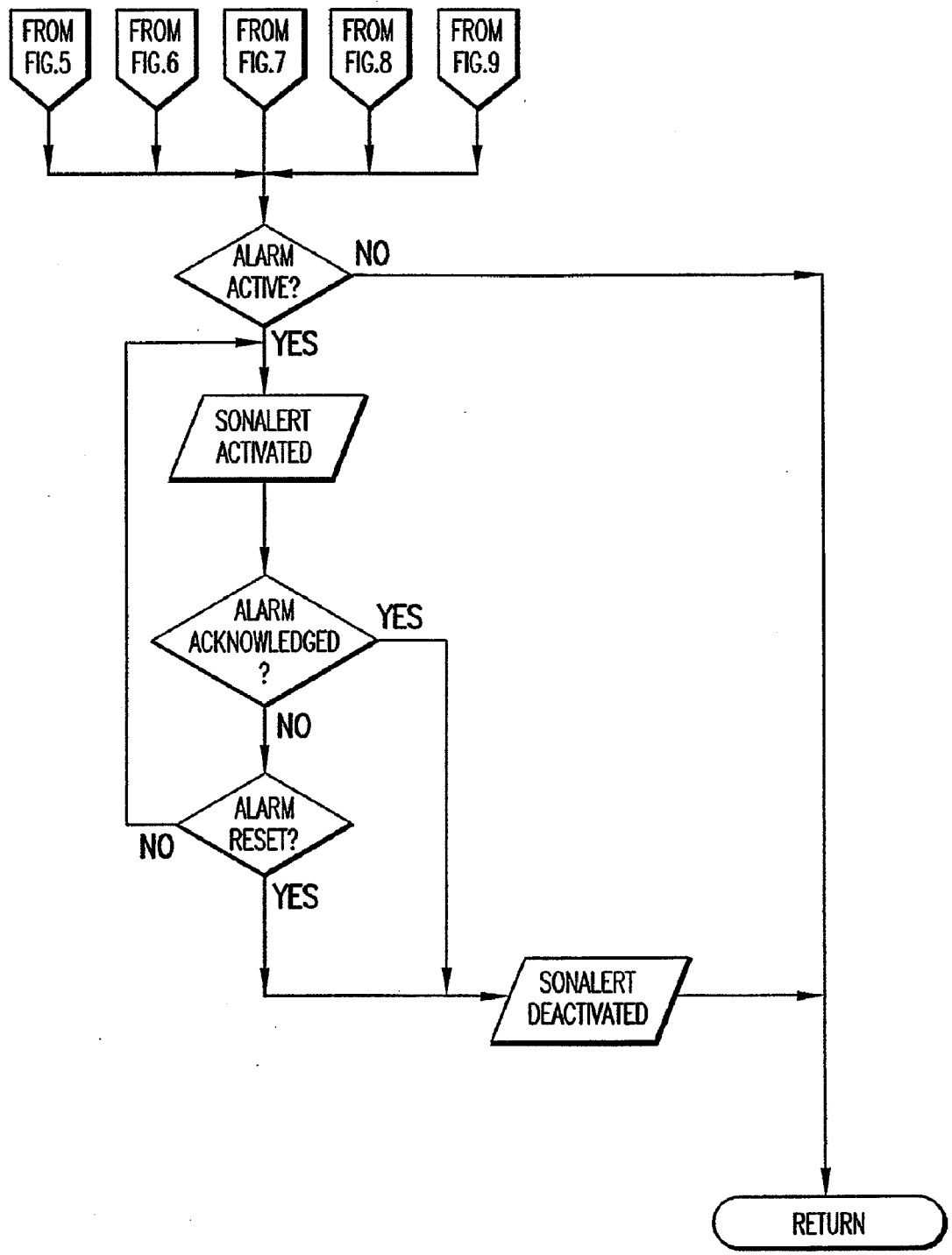

The present invention is directed towards a method for blending chemicals towards homogeneity using the metric of qualitative measurements detecting a specific parameter of chemical recipe endpoint, particularly for the dilution and blending of ultra-high purity chemicals used in the manufacture and treatment of semiconductor device substrates and overall wafer devices. This process can also be applied to the blending of abrasive colloidal suspensions used for the planarization of semiconductor device substrates.

The invention stated hereinafter, is a means to create a process, which reduces time to qualify and accept a liquid chemical batch, by analyzing and correcting a batch during the physical blending process and adjusting the rate at which a liquid chemical stream is added to the batch allowing the system to reach the required endpoint concentration.

The present invention is directed to a system for blending fixed incoming bulk concentrations of liquid chemicals for use in the treatment and manufacturing of semiconductor device substrates and device wafers. Certain processes used in the manufacturing of semiconductor device substrates and device wafers dictate the need for accuracy and precision for reasons following.

One embodiment of the present invention is directed to a blending system, including a plurality of concentrated liquid chemical supply lines, which feed the system basic, concentrated, bulk chemicals, including de-ionized water. The plurality of concentrated liquid supply lines may be sectioned off from the blend vessel by automated two-way and variable control valves, which actuate in an open and closed position. The blend vessel may contain a plurality of connections serving supply, input, and purge ports. The system may consist of the blend vessel, in-line chemical concentration monitor, pumping mechanism, and additional valves to direct the fluid for blending, draining and transfer functions. The blending system also may include a process control system including a controller, an input device, and associated valves for controlling the flow within the system. Additional devices may be incorporated to maintain safety and necessary alarming features reducing both physical damage and health hazards.

The supply lines downstream of the valves may connect to a blend vessel, which may possess supply and return ports, purge ports, and an overflow port. The supply line may connect to an in-line instrument, which may connect to a pumping mechanism. The location of the instrument between the pumping mechanism and blend vessel may be such that concentration information regarding the status of blend homogeneity is measured prior with little variance contributed by turbulence of pressure generation by a pumping mechanism, however, some devices are unaffected by pulsation. The pumping mechanism may connect to a process pipe, which branches to a process drain line and a circulation line. The process drain line may allow the system to drain contents in the event of a service mission, flush cycles for preventative maintenance and service, or for partial contents to drain in the event of an out of specification blend. The circulation line may connect to another branch, which allows the contents to circulate back to the blend vessel during blending sequence and qualification or to be transferred to a day tank, which constantly feeds a circulating process loop to the desired consumption point of use.

The present invention is directed to a system for blending process materials. The blending system is suitable for blending and supplying process materials on demand to a point of use. By process materials it is meant any fluid material capable of being transported through a conduit. For example, process materials may include water, various chemicals, suspensions of solids, slurries or any such other materials. While the blending system of the present invention is for use with any process requiring blended process materials, it is particularly applicable to the blending of ultra high purity chemicals and abrasive slurries and other blending applications were accuracy and precision are desired, specifically in the manufacturing of semiconductor devices and wafer substrates.

The process control system of the blending system of the invention may include a controller, an input device and a plurality of pneumatic solenoid valves, which discharge compressed air to actuate particular features, such as valves, within the system in an automated environment. The controller may be any device capable of receiving signal input and acting upon the information, based on a series of protocols and algorithms, to execute a sequence of operations. For example, the controller may be a microprocessor-based device, such as a computer or a programmable logic controller (PLC). The input device of the process control system may be connected to the controller to provide an input signal representing a desired blend of process materials. The input device may be any device capable of receiving information and relaying it to the controller. For example, the input device may be a keypad or Supervision Control And Data Acquisition (SCADA) node.

The plurality of valves of the process control system may be connected to one or more material supply lines and to the controller. For example, the valves may be located along material supply lines so as to control flow through or into the material supply lines and controlled by the controller. Accordingly, the controller can control flow through or into the material supply lines with the valves in accordance with a desired blend of process materials supplied at the input device. Viewing the blending system as a whole, it will now be clear that the blending system is capable of supplying a desired blend of process materials based on a user specified input. This blend of process materials may be held and supplied on a continuous basis, without interruption, to a point of use. It will also be recognized that the controller may receive additional input to aid in the blending process. For example, the controller may be supplied with information from process appropriate sensors regarding the process materials or process conditions. These features are utilized, where complete communication, in an automated environment, is of utmost importance. It will also be recognized that the controller may also control other aspects of the blending process. For example, the controller may be connected to devices or systems for modifying the properties of the process materials, and may selectively operate these devices or systems based on input received from sensors regarding the condition of the process materials.

The present invention is adaptable for use in a wide variety of applications. Depending on the application, embodiments of the invention may vary. For example, where monitoring of the process materials is desired, such as: overflow of a blend vessel, leak within the system as a whole, or faulted valves, sensors may be used, and these sensors may vary with the process materials. Similarly, the construction of the blending system, such as piping, tubing, and wetted surfaces of instruments and pumps may be adapted to particular process materials. For example, where such process materials may be abrasive or corrosive, such as the polishing slurries and chemicals often employed in the semiconductor industry, these structures may be formed of plastic materials such as fluoropolymers, which are chemically compatible with a majority of the known chemicals, or polypropylene, which is resistant to many of the abrasive compounds used in the chemical mechanical polishing of wafers.

Figure 14:
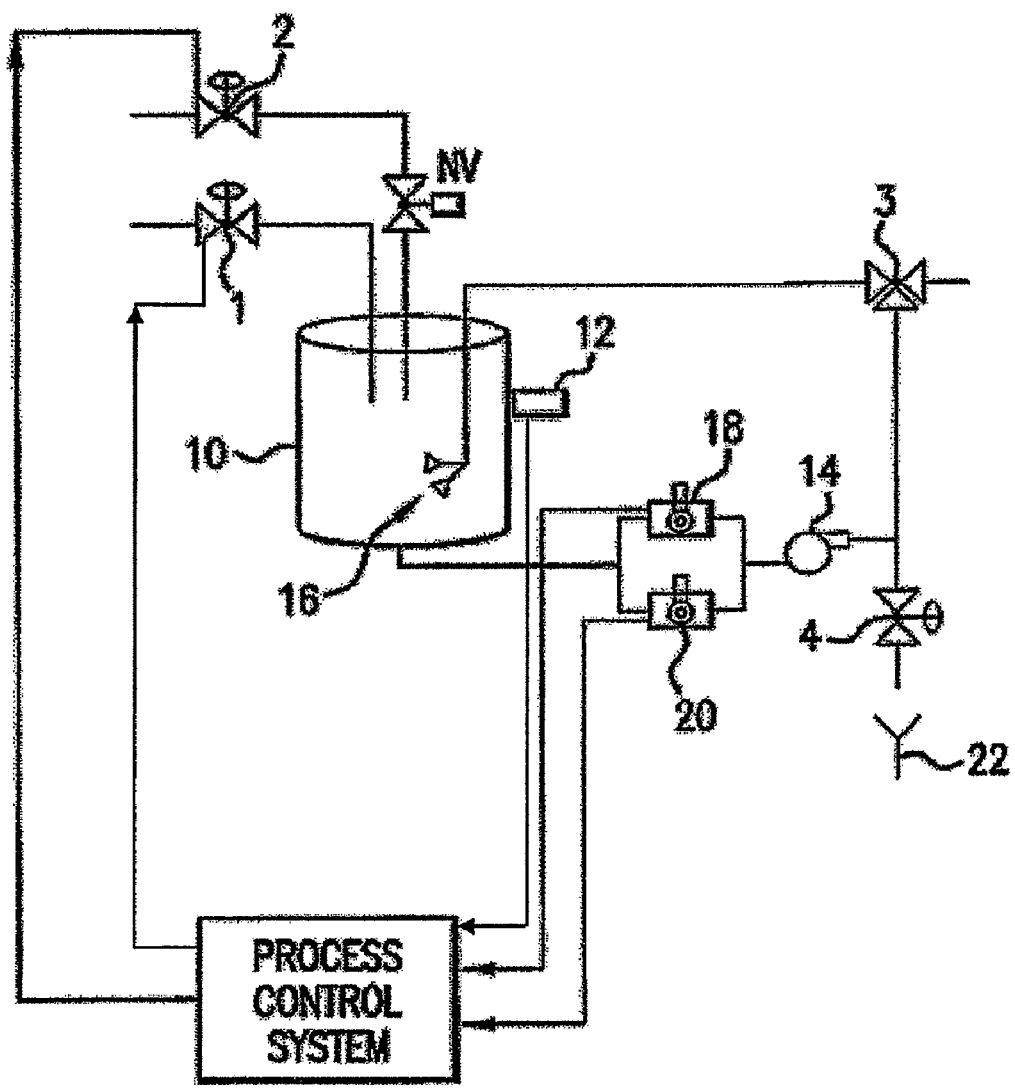
FIG. 14 is a schematic view of an embodiment of the blending process of the present invention.

Referring to the figures, and in particular to FIG. 14, one illustrative embodiment of the invention is shown. In FIG. 14, externally supplied starting compounds, in liquid form, are supplied to the system and regulated through control valves 1 and 2. The control valves are such that the rate of chemical flowing through the devices may be regulated through altering the placement of a sealing surface, for instance a diaphragm seat, across the fluid path. These styles of valve may be electronically controlled, in the case of a stepper or index valve, or pneumatic, in the case of a dual actuator, where the supply pressure through a primary port, displacing the sealing surface, is countered by a resist pressure supplied through a secondary port. Rate controlling valves allow for full flow streams to be reduced to a trickle of droplets and down to full closure of the incoming process stream. In some cases, additional valves are placed at both upstream and downstream locations of the flow control valve to allow for servicing, insuring full closure, and may be a requirement of safety in some manufacturing facilities, where the need to insure absolute shutoff or fail-safe procedures are dictated in areas where personnel are present.

This rate of control of an input chemical stream is determined by the concentration measured by an in-line detection device or instrument. The type of chemical to be blended, and the number of chemical constituents determines the choice of instrument. The minimum number of in-line instruments is one, for example a conductivity probe to measure the concentration of hydrofluoric acid in the process of dilution with de-ionized water from a concentrated value of 49 percent by weight down to 0.500 percent by weight. The type of instruments may include pH probes, ORP probes, density measurement instruments, ultrasonic attenuation, conductivity, zeta potential, transmission spectroscopy, absorption spectroscopy, turbidimetry, nephelometry, near-infra red NIR, or other spectroscopic technique allowing a single chemical species of interest to be isolated and related to a chemical concentration within a solvent. Optical instruments may be used, such as where certain wavelengths of light may be incorporated to a particular chemical type, allowing the concentration to be gauged through the well known Beer-Lambert law. Since chemical species are optically active in certain wavelengths, numerous optical sensors could be assembled to gauge multiplicative chemical solutions, targeting individual species and correctly gauging chemical concentration accurately. This allows process materials to be added sequentially, or even simultaneously, yet still monitored independently and may be contrasted with other methods of sensing where the relative effect of each process material on the sensed value may not be determinable.

Figure 15:
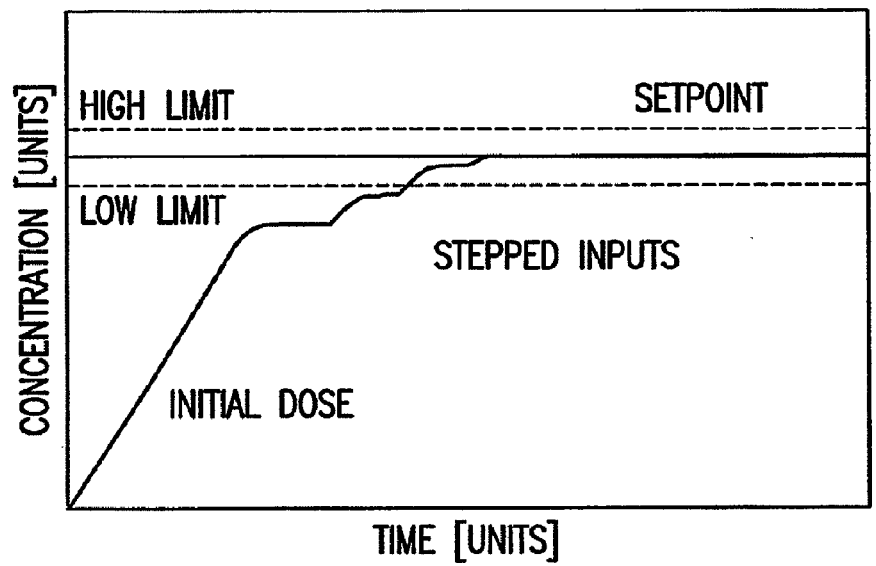
FIG. 15 is a logic schematic of a stepped valve operation addition of chemical achieving a desired setpoint, or endpoint concentration.
Figure 16:
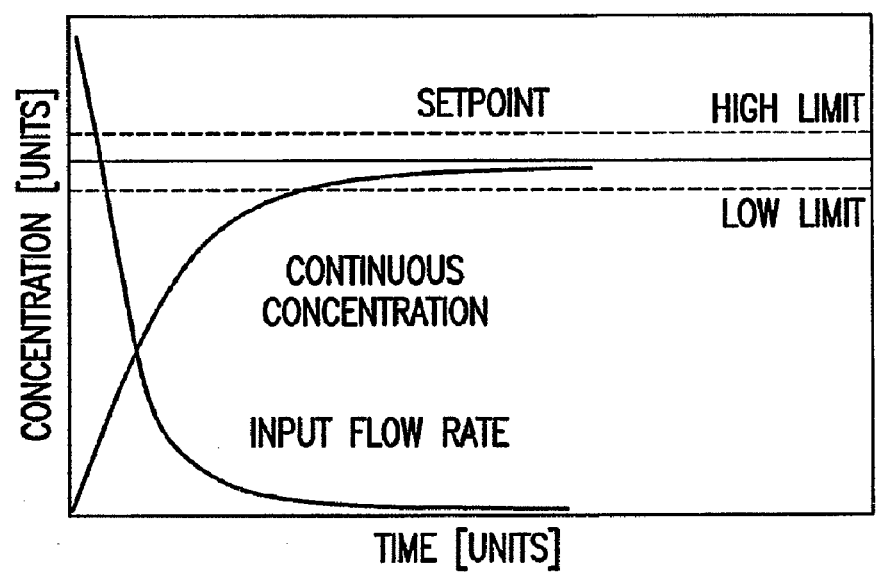
FIG. 16 is another logic schematic of a controlled valve operation addition of chemical achieving a desired setpoint, or endpoint concentration. Also included is a flow curve detailing the operational rate control of concentrated chemical addition to the system over time.
Figure 17:
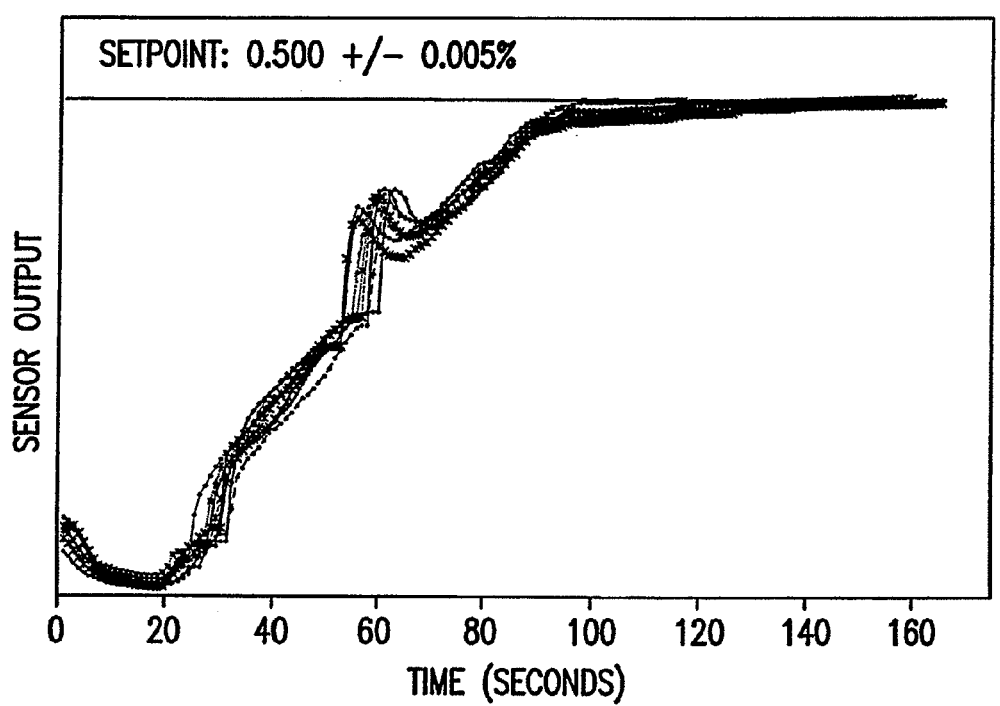
FIG. 17 is actual data showing ten (10) repetitions of 49% weight hydrofluoric acid added to de-ionized water over time, with respect to the final setpoint of 0.500±0.005 % weight hydrofluoric acid.
Figure 18:
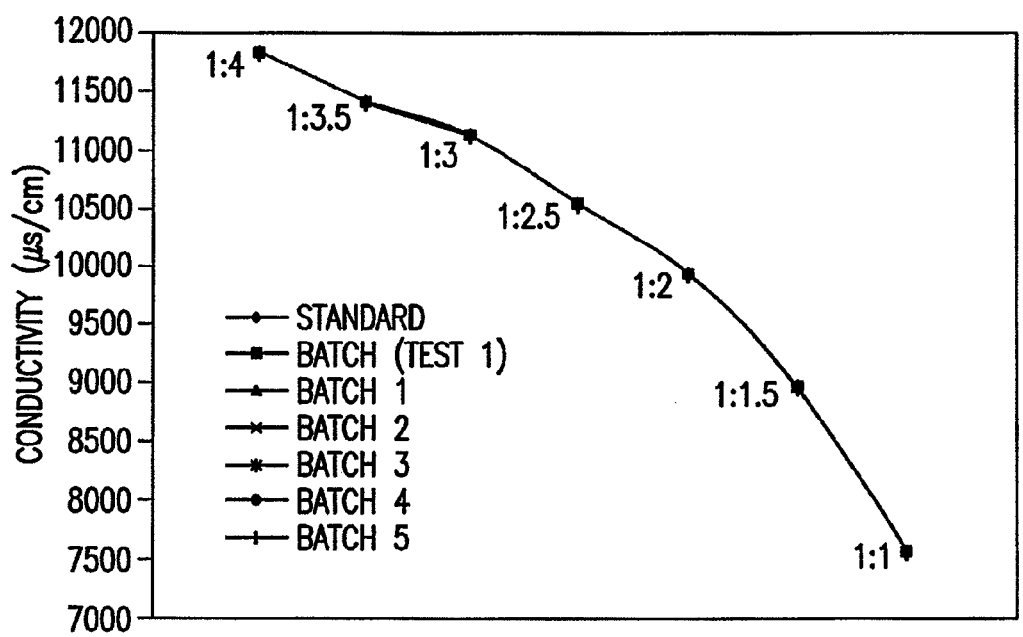
FIG. 18 is actual data showing the average of five (5) separate repetitions for seven (7) separate blends of a two part cerium-based slurry using in-line conductivity sensing to correctly blend and control an additive.
Figure 19:
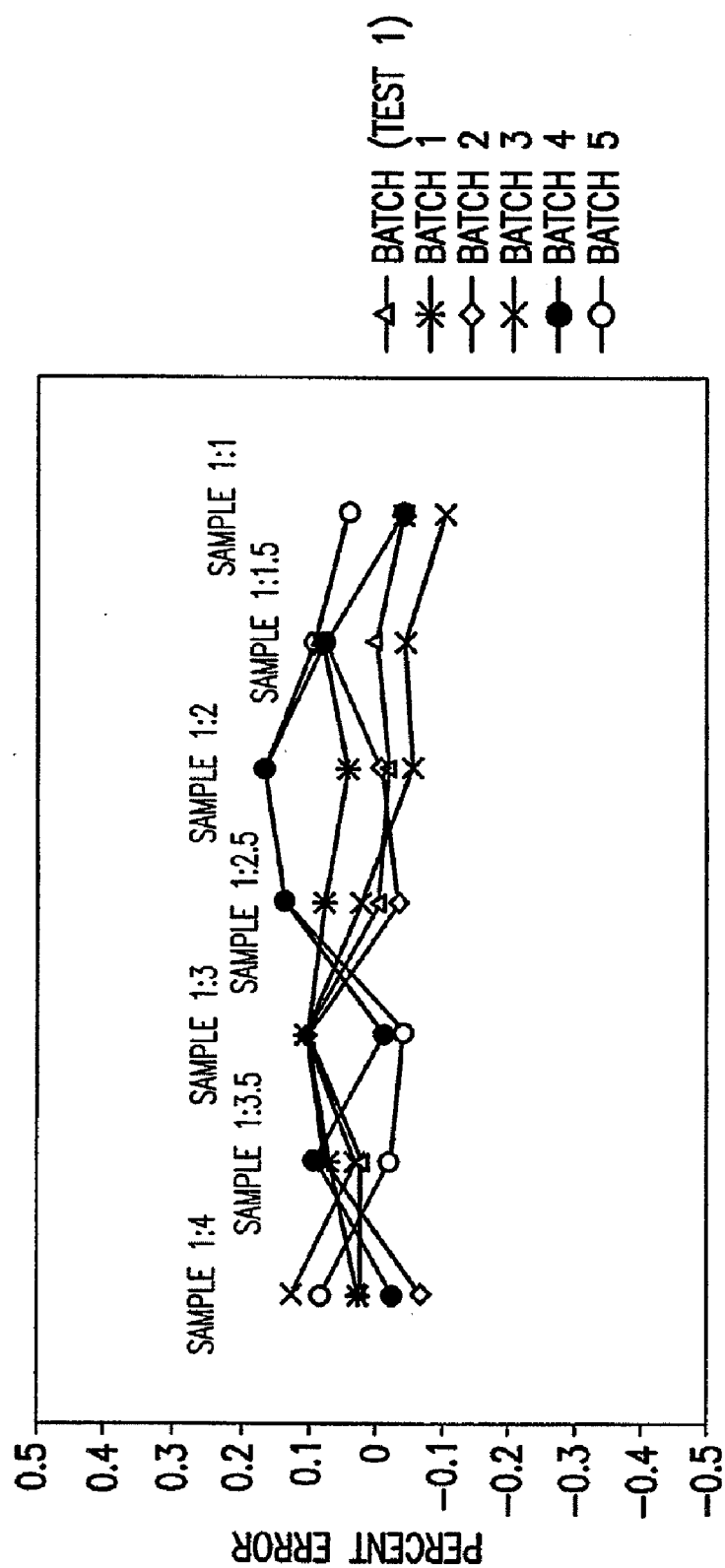
FIG. 19 is a percent of error plot of FIG. 18, displaying the differences recorded between batch to batch variance of the cerium-based slurry and additive calculated as the difference between the set point and the actual, divided by the set point and multiplied by 100.

The process steps for blending liquid chemicals are referred to FIG. 15 and FIG. 16 to explain two different styles to achieve uniform, accurate, and reproducible blends. In each case, a bulk liquid is added to the blend vessel by means of a standard two-way control valve connected to a liquid regulator connected to the blend vessel. The liquid regulator is used to reduce sudden shocks or system fluctuations, also known as water hammer, yet allows initial bulk liquid to arrive into the blend vessel in a smooth, rapid manner. As the initial liquid is added to the blend vessel, a level sensor placed at a particular location, is tripped at a particular liquid height. The exact location of the sensor is not critical to create accurate, reproducible blends. The placement may be arranged to allow for flexible times to complete the blend cycle required to be transferred and, in no means, affects the outcome of the final chemical batch. It is important to note that a rough idea of the level sensor location may be required to insure that the total volume of the blended contents fits within the vessel. This location may be roughly calculated and marked on the container or can easily be achieved during an initial setup of pouring rough volumes of a nonhazardous liquid, such as water, into the tank and setting the level sensor placement. The sensor may actuate the operation of the pump to begin cycling the liquid contents of the blend vessel to establish a uniform reading on the chemical concentration-monitoring instrument. In the event that the system is in a full production environment, the residual liquid remaining in the blend vessel, from previous batches, may be obviously diluted with the incoming, initial liquid chemical and registers as an output value or values for the in-line instrumentation. The contents of the blend vessel may reach a uniform concentration due to a static agitator, such as a spray head, eductor, sparger, or nozzle. This static agitator may serves to create a highly turbulent environment within the blend vessel for the incoming, initial chemical. Upon the tripping of the level sensor, the initial content rate of addition may be controlled by a second level sensor signaling, a controller or processor in the controlling platform, such as a programmable logic controller, which closes the two-way valve, stopping the addition of the initial liquid chemical. The contents of the blend vessel, bulk initial liquid chemical and residual remaining preceding batches circulate through the pumping mechanism and return to the blend vessel until a, uniform value registers from the in-line instrumentation. As an example: for a five (5) gallon blend vessel circulating the contents of de-ionized water and residual remaining hydrofluoric acid of 0.500 percent by weight, the average time to achieve uniformity in the in-line instrument output is less than 10 seconds using and average pump flow rate of three (3) gallons per minute.

Upon completion of this circulation step, the chemical input valves are opened to allow dosing of desired chemicals to blend in sequence. The input of chemicals is such that each stream is allowed to enter into the blend vessel at full flow initially. As a chemical stream enters into the vessel and blends with the initial bulk solvent, the chemical concentration monitor begins to register change as an output value. This signal rises with time, as the result of chemical addition. As the concentration of the desired chemical to be blended increases, the processing signal may control the rate at which the desired chemical enters by adjusting the variable control valve in two ways, which are visually depicted in FIG. 15 and FIG. 16. FIG. 15 depicts a process, where instead of a variable control valve, a regular two-way actuating valve is controlled through a processor (e.g., a processor in the controlling platform) in a time setting. The actuation of the valve is rapidly opened and closed, dispensing small quantities of desired chemical to enter the vessel undergoing agitation. The rate at which the stepped process operates may be is controlled by the increasing concentration value registered by the in-line concentration instrument. The stepped sequence allows for small portions of desired chemical to dispense until the setpoint is achieved and the process completes. FIG. 16 depicts a process using a variable control valve, where the incoming stream of desired chemical is rate controlled over time. As the monitor registers the increase in chemical concentration, the variable control valve reduces the rate at which the desired chemical enters into the blend vessel. This continuous process regulates the flow in a manner that the endpoint is attained in a faster manner than in the stepped version. Both styles of process control may be regulated by the rate at which the instrumentation registers a change and communicates this value to the controller, signaling a change in the valve operation.

This process is such that a full blend sequence is not complete until the desired setpoint is achieved, overcoming the event that a below blend specification occurs. In the event that a blended sequence creates a concentration higher than required, a failsafe subroutine corrects the batch in the following sequence. This sequence partially drains the contents of the blend vessel by actuating the process drain, post pumping mechanism, allowing a small portion of out of specification blend to be removed from the vessel. This amount is achieved through simple timer settings controlling the drain valve. Upon removal of a small volume, the process drain line closes and the system is circulating again. Upon closure of the drain, a small portion of initial, bulk solvent chemical is added into the blend vessel, again by a timer setting controlling the initial, bulk solvent chemical. Upon completion of the initial bulk solvent chemical, the stepped valve actuation or variable control valve addition process takes place.

This process allows for fast blend rates of accurate and reproducible chemical solutions with little loss incurred through overshoot of final blend specifications. As compared with other styles of systems, rates as much as twice the current, published process are achieved through this process.

In semiconductor processes, slurries are used as polishing medium in the manufacture of semiconductor wafers. Slurries are also used to polish optical lenses and other disk related items. The polishing effect of slurries results from fine, inert, abrasive particles suspended in a liquid. Typical abrasives in slurries used in the semiconductor industry are silica, alumina and ceria oxides. Abrasives for slurries are manufactured and sorted into particle size ranges. Typical slurries include particles in the range from 0.05 micron to 0.30 micron in diameter and contain greater than $10^{12}$ particles per cubic centimeter.

For monitoring a slurry in a semiconductor process, an instrument for continuously measuring density, such as densitometer, may be preferred. Measuring density is one manner of tracking concentration. For example, in slurries, the density is related to the amount of inert, non-volatile solids per unit volume.

In slurry processes, an instrument for measuring pH, such as a pH sensor, is also preferred, but not always required. If the pH of the slurry is higher than acceptable, the slurry will be too aggressive and will remove other material chemicals from the wafer, and if the pH is too low, little or no chemical reaction will take place on the wafer.

In semiconductor processes involving chemical mechanical planarization, various chemicals are used as reactants and oxidizers for wafer polishing, as well as in scrubbing solutions, post cleaning solutions and developer solutions. These chemicals are typically shipped in raw-concentrate form. Typical chemicals used for polishing include hydrogen peroxide, potassium hydroxide and ammonium hydroxide. Hydrogen peroxide is used as an oxidizer for removing metallic plugs and layers on a wafer. Controlling the amount of hydrogen peroxide in a blend of process materials controls the rate that material is removed from the wafer surface. Typically, hydrogen peroxide is blended from a 30 weight percent (wt. %) solution to a few percent, such as 2 to 4 wt. % solution. Potassium hydroxide is used in interlayer dielectric (ILD) polishing steps for controlling the pH of a blend of process materials to provide desired polishing of silica dioxide layers. Hydrogen peroxide and ammonium hydroxide mixtures are typically used as cleaning and scrubbing solutions. If these mixtures remain unused, the hydrogen peroxide and ammonium hydroxide decompose into water and ammonia. Accordingly, producing these mixtures as they are used according to the present invention may be preferred.

Other instruments that may be useful for the measurement and monitoring of a chemical process material, and are preferred for such processes in the semiconductor industry, are instruments for determining concentration and reactivity, such as conductivity sensors and oxidation and reduction potential (ORP) sensors, respectively. Conductivity may be used to measure chemical concentration, as tables exist relating conductivity to chemical concentration in either percent weight ratio with respect to total mass of the material, or through chemical terminologies of normality, which is the ratio of molar equivalents per liter of solvent, or molarity, which is the ratio of moles of chemical specified per liter of solvent, where the solvent in most cases is de-ionized water. Accordingly, by monitoring the conductivity of the process material, the concentration may be calculated with respect to the temperature of the process. Since conductivity is a function of temperature of the solution, it is necessary to understand the relationship between the conductance of a desired concentration and the temperature of the solution. With this relationship understood and incorporated into the controlling system, regardless of temperature change within the blend process, the desired conductivity necessary to reach a specified endpoint is related to the temperature, and the dispense of chemical concentrate is complete once this value is determined.

This embodiment of the invention operates on a fundamental endpoint of blend detection, rather than multiple flow meters and dispensing/verification techniques. Current examples include tools that use scales and flowmeters to dispense prescribed volumes of chemical, while verification of the blend uses a conductivity feedback loop. The problems encountered with the current style of batch blend process include errors encountered due to drift in the scale used to measure the mass of dispensed material, errors encountered due to drift in flow meter(s) used to dispense, and errors encountered due to conductivity probe(s) used to verify and spike the blend.

As used herein, the following terms mean as follows:

Conductivity: a measure of the electrical nature of a material. Usually described in fluids as a measure of the specific amount of resistance, in Ohms, for a known distance.

POU: point of use. A specific location within a fluid system where demand for a blended chemical (or series of blended chemicals) is required for consumption. The location is not necessarily an actual tool (for example semiconductor process tool), but locations of dispense.

$C_v$: Flow factor relating the volumetric flow rate through an orifice within a period of time, which generates a pressure drop of 1 psig.

Psig: gauge pressure of a line in pounds per square inch.

UHP (Ultra High Purity): Chemistries with exceedingly low particulate and specific metal ion contamination. These chemicals typically require continuous filtration to remove particulates generated from the system itself. Due to the levels of purity, any exposure to metallic surfaces will shed metal ions into the solution. Extreme purity requirements typically dictate fluoropolymer materials.

ABS: Absolute value of a mathematical argument. Used in statistical analysis.

System Operation: Typical Blend Scenario

With reference to FIG. 14, operation of one particular embodiment of the blending system of the present invention will be described by way of example. Initially valve 1 (typically a pneumatic valve) may be opened, allowing DI (deionized) water to fill blend tank 10 to a proposed volume. The total volume of tank 10 may be such that the absolute blend volume (final) accounts for 75-85% of the total tank volume. This absolute final fluid volume may be subject to SEMI Standards.

The state (open/closed and degree of open/closed) of valve 1, may be controlled by a level sensor 12. Once the fluid volume of DI water activates the sensor, valve 1, closes and may not be used again during the current blend operation unless a blend overshoot occurs (see below). The choice of level sensor may be such that the composition of materials of construction is compatible with any and all chemicals used in the semiconductor industry and the sensitivity is robust.

Upon trigger of level sensor 12, a pump 14 may begin to circulate the contents of the tank. This may allow the agitation of the tank contents through a sparger head 16 to reduce the blend times typically encountered without any means of agitation (e.g., without sparger). As the system circulates DI water, chemical may be dispensed into blend tank 10 through the opening of valve 2 (typically a pneumatic valve).

The raw chemical input supply to the end process may be a constant pressure feed or house supply. The supply line of chemical may be such that, the flow rate is significantly controlled through known, non-energized methods. This may include reduced line size from ½" tubing to ⅛" tubing, and a needle valve on the supply stream.

Conductivity probes 18, 20 may be used to measure changes in the conductive nature of the liquid mixture as it transcends from pure DI (18 M Ohm) to a final, known value for the predicted end result. Two probes may be used to monitor for drift and average value of conductivity, or for redundancy, although only a single probe is sufficient.

As the conductivity value is approaching the target point, (for example, 75% of the end value, although the target point may vary with the application), valve 2 may close for a period of time to allow the contents to blend and homogenize towards a steady conductivity value. Upon stabilization of the contents, valve 2 may actuate open and closed in a rapid manner dispensing raw chemical into the tank. For each actuation of valve 2, the system contents may cycle for an additional time period until the contents have achieved homogeneity.

When a final blend value is achieved, the entire contents of the tank may be dispensed from the blend tank to a secondary system through a valve 3 (typically a three way pneumatic valve).

If at any time during a blend circuit the conductivity probes both record a value greater than a set threshold (e.g., 3%) for more than a set time (e.g., a number of seconds), or, the average value generated from the two probes is recorded as being above a set threshold for more than a set time, the system may activate a blend overshoot sub-routine as follows. The process dump valve 4 (typically pneumatic) may open to process drain 22. Chemical may drain from the system for a set time (e.g., a number of seconds). The amount of chemical drained may be such that approximately 10-15% of the initial chemical batch is removed from the system. The system now may be below the initial level setting of the DI water input. DI water supply valve 1 may be opened and DI water may be supplied until sensor 12 triggers the DI water supply valve to close. At this point, valve 2 may be controlled in the above-described manner to achieve the desired concentration.

Example of Typical System Specifications for System for use in Semiconductor Industry DI Input Facilitated for ¾" input streams at selected psi.

Chemical Input

Facilitated for ⅜"-½" input streams.

20-45 psi supply pressure of input streams.

Supply pressure fluctuation-attributed to pulsation less than or equal to 3 psi total pulsation.

Pneumatic Inputs

Nitrogen, filtered to 0.10 μm.

Fluids, liquid

Wetted surfaces of all materials resistant to chemicals encountered in the semiconductor industry. Teflon or similar, fluorinated, polymers are acceptable.

External surfaces, exposed to ambient atmospheres in non-UHP chemical applications, may be constructed of metal, 316 stainless steel preferred, fluoropolymers a plus.

Operational Environments:

Proposed ambient atmospheres 15-25° C.

Humidity % RH (relative humidity): 40-85%

All exposed fluid surfaces held under an inert atmosphere.

Examples of Blending Specifications

The following table gives examples of chemicals that may be blended according to the present invention, as well as typical blending recipes for them.

| Chemical Name (Applications) | Recipe (by constituent) | Recipe (by mass) |
|---|---|---|
| SC 1 | $HCl:H_2O_2:H_2O$ | 1:1:100 |
| SC 2 | $NH_4OH:H_2O2:H_2O$ | 1:1:100 |
| BOE | $NH_4HF:HF:H_2O$ | 1:1:10 |
| TMAH | DI water dilution | Down to 1% |
| $NH_4OH$ | DI water dilution | Down to 1% |
| KOH | DI water dilution | Down to .001% |
| HF | DI water dilution | Down to .1% |

Precision of Blend

Preferably, the driving device towards overall precision of the blending system of the present invention is the conductivity sensor. In some embodiments, this is the only probe and/or controlling device for the blends. Therefore, tight specifications around device precision relating to conductivity probes may be required. Care may be taken in evaluating probes at the final blend value, less an additional amount, such as twenty percent.

The overall blend precision may be better than±2% of the set point recipe for each separate blend run. Blend run is defined as an individual recipe batch, from start to finish, accompanied by any required DI flushes and/or $N_2$/CDA purges. Precision is defined as: ((ABS|measured value-theoretical value|)/(theoretical value)×100%)<X (X may be 2%).

Reproducibility of the blend may be (Statistical deviation (first sigma)>100 measured points)/actual flow<0.001 mid scale of flow range.

Accuracy of the process may be <±1% of the target point of the specified recipe. ((ABSlmeasured value-actual display valuel)/(actual display value) X 100%).

The overall response time for the blending process may be defined as follows:

Start up: The unit properly dispenses chemical from an off state to an on state within 2 seconds.

Mid-shift: The unit is capable of responding to fluctuations in incoming chemicals. A response time for slight fluctuations is less than 1 second.

FIGS. 1-13 illustrate one embodiment of the invention by way of example only. In the FIGS.: LOOS and HOOS represent Low Out Of Specification and High Out Of Specification, respectively.

FV101-107 represent flow valves, some of which are also shown in FIG. 14. For example FV101, for controlling the input of a first bulk material corresponds to valve 1 in FIG. 14. FV102 controls the input of the second material during the mixing process and corresponds to valve 2 in FIG. 14. Three way valve 3 in FIG. 14 for returning the blend to the blend tank and for distributing the blend, is represented in the process flow diagrams as both FV103 and FV104, respectively. Drain valve 4 in FIG. 14 is corresponds to FV105. FV106 is part of the distribution system and is not shown in FIG. 14. FV301 and 302 also represent valves on the distribution side of the system. FV201 represents a valve to control the input of a third material into the blend tank, or the second chemical to be added to the bulk material in the blend tank. Mixing three or more materials is contemplated, however, many sensors do not readily distinguish between 3 or more materials, resulting in less accurate results.

YYS101 and YS101-YS105 represent various sensors. In particular, YSS101 and YS101 are leak detection sensors. YS102 represents a sensor that signals whether the blend tank is empty or not, and YS103 represents a sensor that signals whether the blend tank is too full. YS104 and YS105 represent sensors on the distribution side of the blend delivery system. YS201 represents a sensor for the third material, or second chemical to be added to the bulk material in the blend tank.

PS101L represents a low pressure switch. PS104H representss a pressure switch for high pressure. Similalry, PS105H-PS107H represent pressures switches for high pressure readings, and PS106L and PS107L represent pressure switches for low pressure readings. P101-102 represent various pumps.

LS101-LS106 represent various level sensors. For example, LS103 represents a level sensor in the blend chamber and LS106 a sensor for material transfer.

It will be understood that each of the elements described herein, or two or more together, may be modified or may also find utility in other applications differing from those described above. While particular embodiments of the invention have been illustrated and described, it is not intended to be limited to the details shown, since various modifications and substitutions may be made without departing in any way from the spirit of the present invention as defined by the following claims.

What is claimed is:

1. A system for blending at least two materials, comprising:
    a blend chamber that includes
        a first inlet to receive a first material, the first inlet being connected to a first valve to control an amount of the first material received at the first inlet; and
        a second inlet to receive a second material, the second inlet being connected to a second valve to control an amount of the second material received at the second inlet;
    a recirculation line connected to the blend chamber to receive a mixture of the first material and the second material and provide the mixture of the first material and the second material back to the blend chamber;
    a sensor, disposed in the recirculation line, to detect an amount of the second material mixed in the mixture of the first material and the second material;
    a drain port fluidly connected to the blend chamber;
    an outlet fluidly connected to the blend chamber to dispense the mixture having a desired concentration of the second material in the mixture; and
    a controller, connected to the sensor, the first valve, the second valve, the drain port, and the outlet, configured to provide:
        a control signal to the first valve to fill the blend chamber to a predetermined volume with the first material at the first inlet,
        a control signal to the second valve, responsive to the blend chamber achieving the predetermined volume, to control the amount of the second material received at the second inlet to achieve the desired concentration of the second material in the mixture,
        a control signal, responsive to the detected amount of the second material in the mixture being greater than the desired concentration, to dispense a portion of the mixture out the drain port, and
        a control signal, responsive to the detected amount of the second material in the mixture being the desired concentration, to dispense a bulk of the mixture at the desired concentration of the second material in the mixture from the blend chamber through the outlet.

2. The system of claim 1, wherein the recirculation line includes:
    an inlet connected to the blend chamber to receive the mixture of the first material and the second material;
    an outlet connected to the blend chamber to provide the mixture of the first material and the second material back to the blend chamber; and
    a pump, to receive the mixture of the first material and the second material from the inlet of the recirculation line and pump the mixture to the outlet of the recirculation line.

3. The system of claim 2, wherein the outlet is connected to the recirculation line and disposed between the pump and the outlet of the recirculation line, to provide the mixture to a tool.

4. The system of claim 3, wherein the sensor is a conductivity sensor.

5. The system of claim 1, wherein the sensor is a conductivity sensor.

6. The system of claim 1, wherein the outlet is connected to the recirculation line, to provide the mixture to a tool.

7. The system of claim 1, wherein the controller further provides a control signal to the second valve to control the amount of the second material received at the second inlet to achieve a first intermediate concentration;
provides a control signal to the second valve to remain closed for a first predetermined time period; and
provides a control signal to the second valve to adjust the amount of the second material received at the second inlet to achieve a second intermediate concentration of the second material in the mixture.

8. The system of claim 7, wherein the controller further provides a control signal to the second valve to remain closed for a second predetermined time period; and provides a control signal to the second valve to adjust the amount of the second material received at the second inlet to achieve a third intermediate concentration of the second material in the mixture.

9. The system of claim 8, wherein the amount of the second material received at the second inlet is adjusted based on predetermined increases in concentration of the second material in the mixture.

10. A method of blending at least two materials to a desired concentration, comprising acts of:
providing a first material in bulk to a blend chamber;
providing, subsequent to the act of providing the first material in bulk, a flow of a second material to the blend chamber through a second inlet;
mixing the flow of the second material into the first material in the blend chamber to create a mixture;
recirculating the mixture in the blend chamber;
measuring a characteristic of the mixture during the act of recirculating;
adjusting the flow of the second material to the blend chamber to attain the desired concentration; and
dispensing a bulk of the mixture at the desired concentration.

11. The method of claim 10, wherein the act of measuring a characteristic of the mixture comprises sensing a characteristic indicative of concentration.

12. The method of claim 10, wherein the act of providing the first and second materials occurs without measuring a concentration of the first and second materials.

13. The method of claim 10, wherein the act of providing the first and second materials occurs without measuring a mass flow rate of the first and second materials.

14. The method of claim 10, further comprising draining a portion of an out of specification blend and leaving the remaining portion of the out of specification blend in the blend chamber.

15. The method of claim 14, further comprising providing an additional amount of the first and second materials.

16. The method of claim 10, further comprising:
interrupting the flow of the second material to the blend chamber for a first predetermined time period; and
adjusting the flow of the second material to the blend chamber to attain an intermediate concentration.

17. The method of claim 16, further comprising:
interrupting the flow of the second material to the blend chamber for a second predetermined time period; and
adjusting the flow of the second material to the blend chamber to attain another intermediate concentration.

18. The method of claim 17, wherein the rate adjustments correspond to concentration increases of the second material in the mixture.

19. A system for blending at least two components, comprising:
a blend chamber having:
a first inlet for receiving a first component, and
a second inlet for receiving a second component;
a recirculation line having an inlet and an outlet fluidly coupled to the blend chamber;
means for detecting a concentration of the second component in a mixture of the first and second components in the recirculation line;
means for adjusting the rate at which the second component is added to the blend chamber;
means for draining a portion of an out of specification mixture from the blend chamber upon a determination that the detected concentration of the second component is out of specification;
means for correcting a remaining portion of the out of specification mixture in the blend chamber; and
means for dispensing a batch of the mixture at a final blend value from the blend chamber.

20. The system of claim 19, wherein the rate is adjusted to achieve an intermediate concentration of the mixture, and further adjusted to achieve another intermediate concentration of the mixture.

21. The system of claim 20, wherein the rate is adjusted in response to the means for analyzing the mixture registering increasing concentration values of the second component in the mixture.

22. The system of claim 19, wherein the means for correcting the remaining portion of the out of specification mixture comprises means for adding the first component to the blend chamber to allow the mixture to reach a concentration lower than a concentration of the out of specification mixture.

23. The system of claim 19, wherein the means for dispensing a batch of the mixture at the final blend value comprises an outlet for delivering the mixture to a tool.

* * * * *